(12) United States Patent  
Yoshida

(10) Patent No.: US 8,731,420 B2
(45) Date of Patent: May 20, 2014

(54) IMAGE FORMING APPARATUS AND METHODS OF SETTING TRANSFER CURRENT AND FORMING IMAGE

(75) Inventor: Ken Yoshida, Chigasaki (JP)

(73) Assignee: Ricoh Company, Limited, Tokyo (JP)

( * ) Notice: Subject to any disclaimer, the term of this patent is extended or adjusted under 35 U.S.C. 154(b) by 989 days.

(21) Appl. No.: 11/870,811

(22) Filed: Oct. 11, 2007

(65) Prior Publication Data

US 2008/0088883 A1 Apr. 17, 2008

(30) Foreign Application Priority Data

Oct. 12, 2006 (JP) .................. 2006-278245
Dec. 12, 2006 (JP) .................. 2006-334396

(51) Int. Cl.
*G03G 15/10* (2006.01)
*H04N 1/23* (2006.01)

(52) U.S. Cl.
USPC ............ 399/66; 399/44; 399/49; 399/55; 399/56; 399/69; 399/94; 399/159; 399/302; 399/313; 358/300; 358/518; 358/406; 358/443; 358/1.9; 358/1.13; 358/1.14; 358/1.15

(58) Field of Classification Search
USPC ............ 399/8, 18, 44, 49, 55, 56, 66, 69, 70, 399/94, 111, 159, 302, 310, 313, 328, 333, 399/346; 358/300, 518, 406, 443; 347/133, 347/247

See application file for complete search history.

(56) References Cited

U.S. PATENT DOCUMENTS

| | | | | |
|---|---|---|---|---|
| 4,954,843 A | * | 9/1990 | Oka et al. ................ | 399/156 |
| 5,915,145 A | * | 6/1999 | Shimura et al. ........... | 399/66 |
| 5,991,555 A | * | 11/1999 | Suzumi et al. ............ | 399/18 |
| 6,134,416 A | * | 10/2000 | Tamiya .................... | 399/313 |
| 6,529,693 B2 | * | 3/2003 | Tomizawa et al. ........ | 399/44 |
| 6,718,146 B2 | * | 4/2004 | Nakamori ................. | 399/22 |
| 6,792,219 B2 | | 9/2004 | Hisada | |
| 6,947,679 B2 | * | 9/2005 | Kato et al. ................ | 399/45 |
| 7,003,238 B2 | | 2/2006 | Yoshida et al. | |
| 7,280,792 B2 | | 10/2007 | Sawai et al. | |
| 2005/0271406 A1 | * | 12/2005 | Okano et al. .............. | 399/50 |

FOREIGN PATENT DOCUMENTS

| | | |
|---|---|---|
| JP | 7-209931 | 8/1995 |
| JP | 8-83006 | 3/1996 |
| JP | 2704277 | 10/1997 |
| JP | 11-109768 | 4/1999 |

(Continued)

OTHER PUBLICATIONS

U.S. Appl. No. 12/119,050, filed May 12, 2008, Muto et al.

(Continued)

*Primary Examiner* — Steven Kau
(74) *Attorney, Agent, or Firm* — Oblon, Spivak, McClelland, Maier & Neustadt, L.L.P.

(57) ABSTRACT

An image forming apparatus includes an image carrier, a transferer to apply a constant-current controlled bias to a transfer medium to form a transfer electric field, a constant-current source configured to apply an electrical current to the transferer, an electrical characteristic detector, an environment detector, a first corrector, a second corrector, and a third corrector. The electrical characteristic detector detects an electrical characteristic value corresponding to a resistance in a current path from the constant-current source to the transferer. The environment detector detects an environmental condition inside the image forming apparatus. The first corrector corrects the electrical current based on the electrical characteristic detection and a predetermined threshold. The second corrector corrects the electrical current based on the environment detection. The third corrector sets the threshold based on the environment detection.

17 Claims, 14 Drawing Sheets

(56) References Cited

FOREIGN PATENT DOCUMENTS

| | | |
|---|---|---|
| JP | 3082566 | 6/2000 |
| JP | 2003-5541 | 1/2003 |
| JP | 2003-122068 | 4/2003 |
| JP | 2003-195657 | 7/2003 |
| JP | 2003-287966 | 10/2003 |
| JP | 2005-134415 | 5/2005 |
| JP | 2006-126320 | 5/2006 |

OTHER PUBLICATIONS

Japanese Office Action issued Dec. 2, 2011, in Patent Application No. 2006-278245.

Japanese Office Action issued Dec. 2, 2011, in Patent Application No. 2007-102024.

* cited by examiner

| PRIMARY ROLLER RESISTANCE [Ω] | TRANSFER CURRENT AFTER ADJUSTMENTS |
|---|---|
| $1 \times 10^{7.0}$ | 35 μA (+5 μA) |
| — TH1 1.0kV | |
| $1 \times 10^{7.5}$ | 30 μA (0 μA) |
| — TH2 1.6kV | |
| $1 \times 10^{8.0}$  $1 \times 10^{8.5}$ | 25 μA (−5 μA) |
| — TH3 2.4kV | |
| $1 \times 10^{9.0}$ | 20 μA (−10 μA) |

| | COMMON |
|---|---|
| TH1 | 1.0kV |
| TH2 | 1.6kV |
| TH3 | 2.4kV |

| | ADJUSTMENT AMOUNT [μA] | TRANSFER CURRENT AFTER ADJUSTMENTS |
|---|---|---|
| DV < TH1 | +5 | 35 μA |
| TH1 ≤ DV < TH2 | 0 | 30 μA |
| TH2 ≤ DV < TH3 | −5 | 25 μA |
| DV ≥ TH3 | −10 | 20 μA |

| | 27°C/80% | 23°C/50% |
|---|---|---|
| MEASURED VOLTAGE | 900V | 1200V |
| ADJUSTMENT AMOUNT BY FIRST CORRECTOR | +5 μA | 0 μA |
| ADJUSTMENT AMOUNT BY SECOND CORRECTOR | +5 μA | 0 μA |
| TRANSFER CURRENT AFTER ADJUSTMENTS | 40 μA | 30 μA |

|  | 27°C 80% | 23°C 50% |
|---|---|---|
| TH1 | 0.6kV | 1.0kV |
| TH2 | 1.2kV | 1.6kV |
| TH3 | 2.0kV | 2.4kV |

|  | ADJUSTMENT AMOUNT [μA] | TRANSFER CURRENT AFTER ADJUSTMENTS |
|---|---|---|
| DV < TH1 | +5 | 35 μA |
| TH1 ≤ DV < TH2 | 0 | 30 μA |
| TH2 ≤ DV < TH3 | −5 | 25 μA |
| DV ≥ TH3 | −10 | 20 μA |

|  | 27°C/80% | 23°C/50% |
|---|---|---|
| MEASURED VOLTAGE | 900V | 1200V |
| ADJUSTMENT AMOUNT BY FIRST CORRECTOR | 0 μA | 0 μA |
| ADJUSTMENT AMOUNT BY SECOND CORRECTOR | +5 μA | 0 μA |
| TRANSFER CURRENT AFTER ADJUSTMENTS | 35 μA | 30 μA |

| | COMMON |
|---|---|
| TH1 | 0.5kV |
| TH2 | 1.0kV |
| TH3 | 2.0kV |
| TH4 | 3.0kV |

| | SHEET SIZE ADJUSTMENT COEFFICIENT |
|---|---|
| DV < TH1 | 250% |
| TH1 ≤ DV < TH2 | 200% |
| TH2 ≤ DV < TH3 | 150% |
| TH3 ≤ DV < TH4 | 125% |
| DV ≥ TH4 | 100% |

| | 27°C/80% | 23°C/50% |
|---|---|---|
| MEASURED VOLTAGE | 0.8kV | 1.5kV |
| SHEET SIZE ADJUSTMENT COEFFICIENT | 200% | 150% |
| ENVIRONMENT ADJUSTMENT COEFFICIENT | 125% | 100% |
| TOTAL | 250% | 150% |

|      | 27°C/80% | 23°C/50% |
|------|----------|----------|
| TH1  | 0.3kV    | 0.5kV    |
| TH2  | 0.6kV    | 1.0kV    |
| TH3  | 1.4kV    | 2.0kV    |
| TH4  | 2.2kV    | 3.0kV    |

|                  | SHEET SIZE ADJUSTMENT COEFFICIENT |
|------------------|-----------------------------------|
| DV < TH1         | 250%                              |
| TH1 ≤ DV < TH2   | 200%                              |
| TH2 ≤ DV < TH3   | 150%                              |
| TH3 ≤ DV < TH4   | 125%                              |
| DV ≥ TH4         | 100%                              |

|                                     | 27°C/80% | 23°C/50% |
|-------------------------------------|----------|----------|
| MEASURED VOLTAGE                    | 0.8kV    | 1.5kV    |
| SHEET SIZE ADJUSTMENT COEFFICIENT   | 150%     | 150%     |
| ENVIRONMENT ADJUSTMENT COEFFICIENT  | 125%     | 100%     |
| TOTAL                               | 188%     | 150%     |

IMAGE FORMING APPARATUS AND METHODS OF SETTING TRANSFER CURRENT AND FORMING IMAGE

CROSS-REFERENCE TO RELATED APPLICATIONS

This patent specification claims priority to Japanese Patent Application Nos. JP2006-278245, filed on Oct. 12, 2006 and JP2006-334396, filed on Dec. 12, 2006 in the Japan Patent Office, the entire contents of each of which are hereby incorporated by reference herein.

BACKGROUND OF THE INVENTION

1. Field of the Invention

The present invention generally relates to an image forming apparatus including a transferer and methods of setting a transfer electrical current and forming an image.

2. Discussion of the Background

In general, an electrophotographic image forming apparatus employing an intermediate transfer method, such as a copying machine, a printer, a facsimile machine, etc., includes a photoreceptor, an intermediate transfer member and transferers of a primary transferer and a secondary transferer. Such an image forming apparatus forms a toner image on the photoreceptor according to image information, and transfers the toner image with the primary transferer onto the intermediate transfer member, for example, an endless intermediate transfer belt stretched around a plurality of rollers. The primary transferer receives a transfer bias (transfer voltage) to form a transfer electrical field between the photoreceptor and the intermediate transfer belt. The toner image is further transferred onto a transfer material by the secondary transferee. The primary and the secondary transferers preferably transfer the toner image precisely and reliably onto the intermediate transfer belt or the transfer material. That is, high reliability and transfer efficiency are required.

As a method of controlling the transfer bias, a constant-current control method has been proposed. Because electric resistance of the transferee changes with changes in environmental conditions (e.g., temperature and humidity) and energization conditions, a voltage applied to the transferer is adjusted in response to the changes. Therefore, a stable electric field and high transfer efficiency can be obtained.

However, the resistance of the transferer further changes over time by receiving the transfer voltage. When the resistance of the transferer is extremely low, effects of the resistance of a toner layer increases. Therefore, transfer efficiency is changed depending on the area of the toner image. When the resistance of the transferer is extremely high, a higher voltage is applied to the transferee, which may cause a leak current and accordingly lower transfer efficiency. Further, transfer efficiency changes depending on the size of the transfer material in the case of the secondary transferee, although an image forming apparatus is generally configured to handle different sizes of transfer materials.

To cope with the change over time in the resistance of the transferer, a method in which a transfer voltage is controlled based on a detected resistance value of the transferer has been proposed. Further, to cope with changes in the resistance due to changes in environmental conditions, a method using an environment detector and a table storing current adjustment values in relation to environmental conditions has been proposed. The environment detector is configured to detect environmental conditions while image forming is performed. The transfer voltage is controlled by correcting a current output to the transferer based on a detected condition and correlation in the table.

SUMMARY OF THE INVENTION

In view of the foregoing, in one illustrative embodiment of the present invention, an image forming apparatus includes an image carrier configured to carry a toner image thereon, a transferer, a constant-current source configured to apply an electrical current to the transferer, an electrical characteristic detector, an environment detector, a first corrector, a second corrector, and a third corrector. The transferer is configured to apply a bias that is controlled in a constant-current control method to a transfer medium to form a transfer electric field in a transfer area in which the image carrier and the transfer medium face each other to transfer the toner image onto the transfer medium. The electrical characteristic detector is configured to detect an electrical characteristic value corresponding to a resistance in a current path through which the current flows to the transferer. The environment detector is configured to detect an environmental condition inside the image forming apparatus. The first corrector corrects a value of the electrical current based on the detected electrical characteristic value and a predetermined threshold. The second corrector corrects the value of the electrical current based on the detected environmental condition. The third corrector sets the threshold based on the detected environmental condition.

In another illustrative embodiment of the present invention, an image forming apparatus applies a transfer bias that is controlled in a constant-current control method with a transferer to a transfer medium to form a transfer electric field in a transfer area in which the image carrier and the transfer medium face each other to transfer the toner image from the image carrier onto the transfer medium, detects an electrical characteristic value corresponding to a resistance in a current path through which an electrical current applied to the transferee flows, detects an environmental condition therein, and sets a transfer current based on at least results of the electrical characteristic detection and the environment detection. Setting a transfer current includes correcting the electrical current applied to a transferer based on the electrical characteristic detection and a predetermined threshold, correcting the electrical current based on the environment detection, and setting the threshold based on the environment detection.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
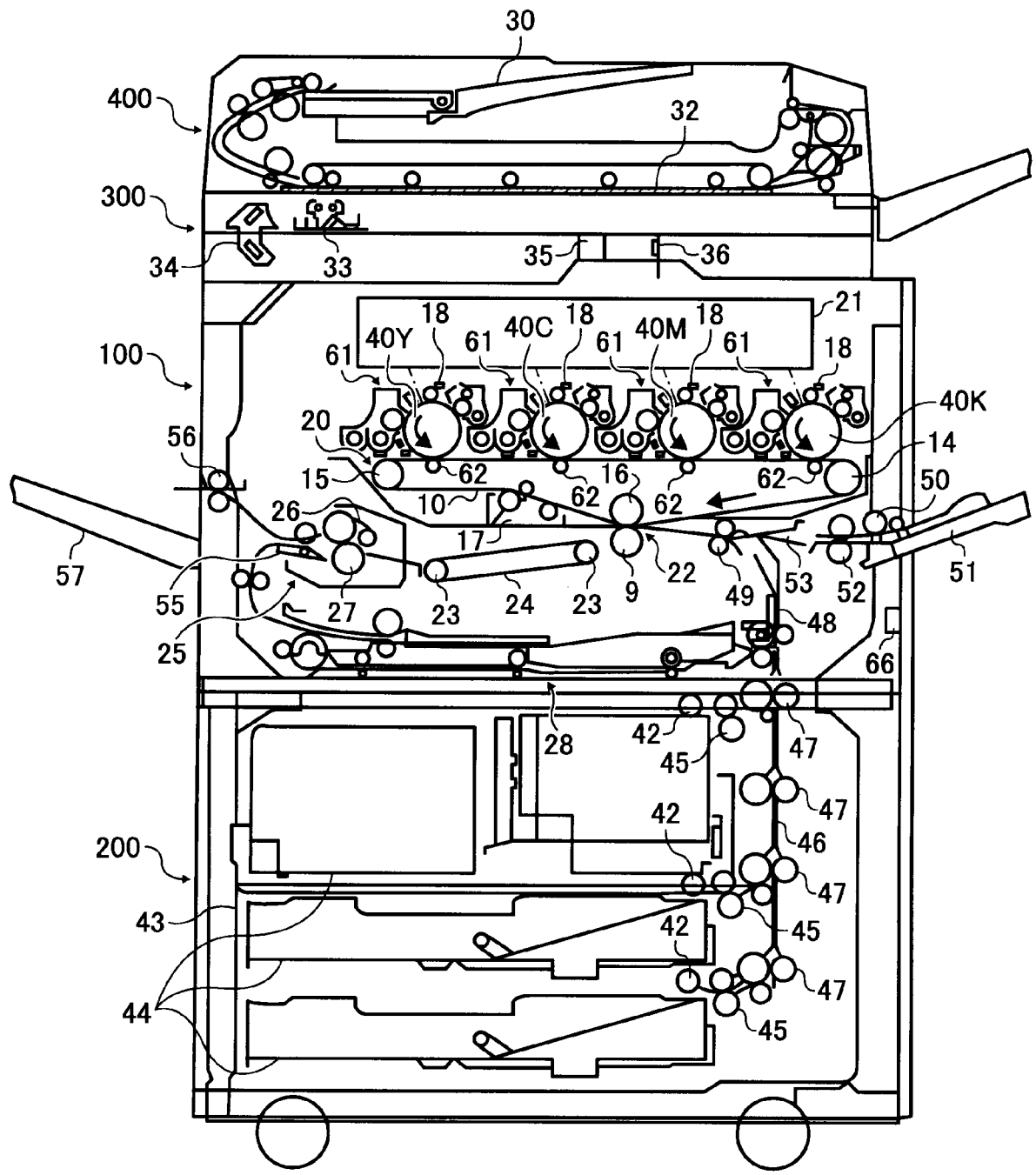
FIG. 1 illustrates an example of a schematic configuration of an image forming apparatus according to an example embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views thereof, and particularly to FIG. 1, a color image forming system according to an example embodiment of the present invention is described.

Referring to FIG. 1, reference numeral 100 indicates an image forming apparatus, reference numeral 200 indicates a sheet feeder on which the image forming apparatus 100 is mounted, reference numeral 300 indicates a scanner provided over the image forming apparatus 100, and reference numeral 400 indicates an automatic document feeder (ADF) provided over the scanner 300. In an example embodiment, the image forming apparatus 100 is a tandem type electronographic copier employing an intermediate transfer (indirect transfer) method.

The image forming apparatus 100 includes a transferer 20 at a center portion thereof. The transferer 20 includes an intermediate transfer belt 10 that is an intermediate transferrer, a driving roller 14, a driven roller 15, a secondary transfer roller 16, primary transfer rollers 62, and a roller 9. The intermediate transfer belt 10 is stretched around the driving roller 14, the driven roller 15, and the secondary transfer roller 16 and rotates clockwise in FIG. 1. The primary transfer rollers 62 and the intermediate transfer belt 10 constitute a primary transferer.

The image forming apparatus 100 further includes an intermediate transfer belt cleaner 17 that is provided at the left of the secondary transfer roller 16 in FIG. 1, and drum-shaped photoreceptors 40Y, 40C, 40M, and 40K provided along a linear portion of the intermediate transfer belt 10 stretched between the driving roller 14 and the driven roller 15. The intermediate transfer belt cleaner 17 removes toner remaining on the intermediate transfer belt 10 after an image is transferred therefrom.

The letters Y, C, M, and K indicate yellow, cyan, magenta, and black, respectively. The photoreceptors 40Y, 40C, 40M, and 40K on which yellow, cyan, magenta, and black toner images are formed are arranged along a moving direction of the intermediate transfer belt 10 (belt moving direction). Hereinafter each of the photoreceptors 40K, 40Y, 40M, and 40C are referred to as a photoreceptor 40, when not distinguished. The photoreceptor 40 is rotatable counterclockwise in FIG. 1.

Around the photoreceptor 40, a charger 18, a developing unit 61 including a developing sleeve, a cleaner 63, and a discharger, not shown, are provided.

The image forming apparatus 100 further includes an irradiator 21 (laser writing device) above the photoreceptors 40. The irradiator 21 is an optical system to write image information and includes a laser diode (LD).

The roller 9 is configured to press against the secondary transfer roller 16 via the intermediate transfer belt 10. The roller 9, the secondary transfer roller 16, and the intermediate transfer belt 10 constitute a secondary transferer 22 that transfers the toner image from the intermediate transfer belt 10 onto a sheet of recording medium in a secondary transfer process. The sheet is then sent to a secondary transfer nip, which is provided between the intermediate transfer belt 10 and the roller 9. Alternatively, the secondary transferer 22 may include a non-contact transfer charger.

The image forming apparatus 100 further includes a fixer 25 provided downstream of the roller 9 in a sheet transport direction, a pair of rollers 23, a transfer belt 24 stretched around the rollers 23, and a sheet reverser 28. The fixer 25 includes an endless fixing belt 26 and a pressure roller 27 pressed against the fixing belt 26. After the secondary transfer process, the transfer belt 24 transports the sheet to the fixer 25 that fixes the image on the sheet.

The sheet reverser 28 is located beneath the secondary transferee 22 and reverses the sheet to eject the sheet upside down or to record an image on a second side (back side) of the sheet.

The image forming apparatus 100 further includes a pair of registration rollers 49, a feed roller 50, a manual feed tray 51, a pair of separation rollers 52, a manual feed path 53, a switching claw 55, a pair of ejection rollers 56, and an ejection tray 57. The manual feed tray 51 is attached to a side of the image forming apparatus 100. The image forming apparatus 100 further includes a temperature and humidity detector 66 as an environment detector near the manual tray 51, and a control panel, not shown. The temperature and humidity detector 66 is to detect temperature and humidity inside image forming apparatus 100. With the control panel, a user operates the image forming system.

The scanner 300 is an optical system to read image information of an original document and includes a contact glass 32, a first carriage 33, a second carriage 34, an imaging lens 35, and a reading sensor 36. The first carriage 33 includes a light source and a mirror. The second carriage 34 includes a pair of mirrors. The ADF 400 includes a document table 30 and is configured to forward the original document placed on the document table 30 automatically to the contact glass 32.

The sheet feeder 200 includes a plurality of feed rollers 42, a paper bank 43, a plurality of separation rollers 45, a sheet feeding path 46, and a plurality of conveyance rollers 47. The paper bank 43 includes a plurality of sheet cassettes 44. The sheet feeder 200 sends a sheet of transfer media to the image forming apparatus 100.

Processes to make a color copy of an original document with the above-described image forming system are described below.

The user places the original document on the document table 30. Alternatively, the user opens the ADF 400, places the original document on the contact glass 32 of the scanner 300, and closes the ADF 400 to hold the sheet with the ADF 400.

When the user pushes a start button, not shown, the original document set on the ADF 400 is forwarded onto the contact glass 32. Alternatively, the scanner 300 is immediately driven to read the image information of the original document when the original document is placed on the contact glass 32.

The scanner 300 starts to run the first carriage 33 and the second carriage 34. The light source of the first carriage 33 emits light to the original document. The light reflected by a surface of the original document is directed to the second carriage 34 by the mirror in the first carriage 33. The mirrors in the second carriage 34 further reflect the light so that the light makes a 180-degree turn, goes through the imaging lens 35, and enters the reading sensor 36. Thus, the reading sensor 36 reads image information on the original document.

Pressing the start button further allows the intermediate transfer belt 10 and the photoreceptors 40Y, 40C, 40M, and 40K to start to rotate. After the surfaces of the photoreceptors 40Y, 40C, 40M, and 40K are uniformly charged, the irradiator 21 emits a laser light to each of the photoreceptors 40Y, 40C, 40M, and 40K to form electrostatic latent images thereon. Each of the latent images is developed by the developing unit 61 into a single color image (toner image) of yellow, cyan, magenta, or black having a negative polarity.

A bias of opposite polarity (positive bias) to the polarity of the toner image is applied to each of the primary transfer rollers 62. Each of the primary transfer rollers 62 applies a transfer bias to the intermediate transfer belt 10 to form a transfer electric field in an area between the photoreceptor 40 and the intermediate transfer belt 10 so as to draw the toner image to the intermediate transfer belt 10 from the photoreceptor 40. In the primary transfer process, the photoreceptor 40 serves as an image carrier and the intermediate transfer belt serves as a transfer medium. The primary transfer rollers 62 transfer the single color images sequentially from the photoreceptors 40Y, 40C, 40M, and 40K and superimpose one on another on the intermediate transfer belt 10 that is rotating clockwise in FIG. 1. Thus, a synthesized full color image (toner image) is formed on the intermediate transfer belt 10.

Along with the above-described image forming, the feed roller 42 corresponding to the selected sheet cassette 44 in the sheet feeder 200 rotates to send a sheet therefrom. A pair of separation rollers 45 corresponding to the feed roller 42 ensures that the sheets are sent one by one to a transport path 46. The conveyance rollers 47 forward the sheet to a transport path 48 in the image forming apparatus 100. Alternatively, the user may use the manual feed tray 51. The feed roller 50 rotates to send out a sheet from the manual feed tray 51. The pair of separation rollers 52 separates the sheets to send the sheets one by one to the manual feed path 53.

The sheet is transported along the transport path 48 or the manual feed path 53, until the pair of registration rollers 49 stop the sheet by sandwiching a leading edge of the sheet therebetween. The pair of registration rollers 49 is configured to forward the sheet timely to the secondary transfer nip so that the sheet overlaps the color image on the intermediate transfer belt 10.

In an example embodiment, a bias of the same polarity (negative bias) as the polarity of the toner image is applied to the secondary transfer roller 16. The secondary transfer roller 16 applies a transfer bias to the sheet to form a transfer electrical field in an area between the intermediate transfer belt 10 and the sheet so as to push the toner image from inside the intermediate transfer belt 10 toward the sheet. Alternatively, a positive bias may be applied to the roller 9 to draw the toner image from outside of the intermediate transfer belt 10. In the secondary transfer process, the intermediate transfer belt 10 serves as an image carrier and the sheet is a transfer medium.

While the sheet passes through the secondary transfer nip, the secondary transferer 22 transfers the color image onto a first side (front side) of the sheet.

The secondary transfer belt 24 forwards the sheet to the fixer 25 where the color image is fixed on the sheet with heat and pressure. After the fixing process, the switching claw 55 switches a sheet ejection route between the pair of ejection rollers 56 and the reverser 28. The pair of ejection rollers 56 ejects the sheet onto the ejection tray 57.

However, when a double-sided copy mode is selected, the switching claw 55 directs the sheet to the reverser 28. The reverser 28 turns the sheet upside down. The sheet is then sent to the secondary transfer nip, where an image is recorded on a second side of the sheet. After that, the ejection roller 56 ejects the sheet onto the ejection tray 57. When images are formed on two or more sheets, the above-described processes are repeated.

A method of forming a monochrome image (a black color image) on the intermediate transfer belt 10 is described below.

The driven roller 15 and the secondary transfer roller 16 are moved so as to disengage the photoreceptors 40Y, 40C, and 40M from the intermediate transfer belt 10. In the case of a one-drum type image forming apparatus, which includes only one photoreceptor differently from the tandem type image forming apparatus 100 illustrated in FIG. 1, it is common to form a black color image at first to shorten a first copy speed. When a color copy mode is selected, yellow, cyan, and magenta color images are formed after black color image is formed.

In the above-described configuration, the registration rollers 49 are often grounded. Alternatively, a bias may be applied to the registration rollers 49 to remove paper dust from the sheet. For example, the bias is applied with a conductive rubber roller having a diameter of 18 mm, covered with a 1 mm layer of conductive nitrile butadiene rubber (NBR). The rubber material has a volume resistivity of about $10^{9.0}$ Ωcm. A voltage of about −800 V is applied to the registration roller 49 located at a side of a front surface of the sheet to which the toner image is transferred. A voltage of about 200 V is applied to the registration roller 49 located at a side of a back surface of the sheet.

Generally, paper dust is not likely to be transported to the photoreceptor 40 in the intermediate transfer method. Therefore, the registration rollers 49 may be grounded with disregard to paper dust. As the bias, a DC (direct current) voltage is commonly used. Alternatively, an AC (alternating current) voltage having a DC offset component may be used to charge the sheet more uniformly.

The front surface of the sheet is slightly charged negatively after passing through the registration rollers 49 to which the biases are applied as described above. Therefore, a transfer condition for the case in which the biases are applied to the registration rollers 49 is different from the case in which the biases are not applied to the registration rollers 49.

In the above-described configuration, a transfer bias is controlled in a constant-current control method. When the primary transferee is controlled in the constant-current control method, a voltage applied to the primary transferee (primary transfer bias) can be adjusted in response to changes in electric resistance thereof caused by changes in environmental conditions (e.g., temperature and humidity) and an energization condition. Therefore, a stable electric field and high transfer efficiency can be obtained. The resistances of the components of the primary transferer, the intermediate transfer belt 10, the primary transfer rollers 62, etc., generally change over time by receiving a transfer voltage.

Figure 2:
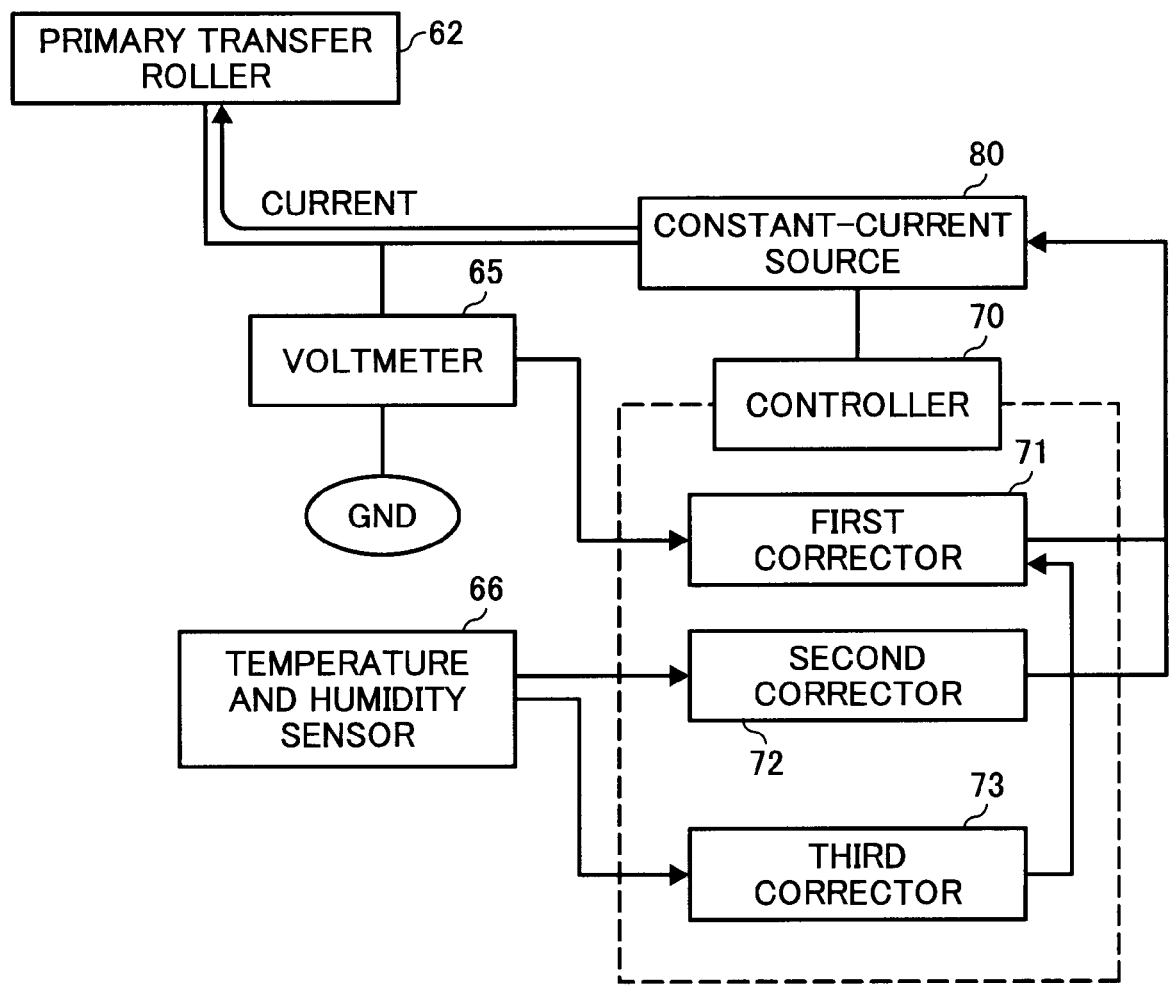
FIG. 2 is a control block diagram for a primary transfer bias.

FIG. 2 illustrates a control block for the primary transfer bias. As illustrated in FIG. 2, the control block includes a voltmeter 65, a constant-current source 80 to apply a constant electrical current to the primary transfer roller 62, and a controller 70 to control various operations executed by the image forming apparatus 100. One terminal of the voltmeter 65 is grounded and the other terminal thereof connects to a current path between the primary transfer roller 62 and the constant-current source 80.

The voltmeter 65 is an electrical characteristic detector configured to detect an electrical characteristic value. In an embodiment, the electrical characteristic value includes a voltage. The voltmeter 65 measures a voltage in the current path from the constant-current source 80 to the primary transfer roller 62. Because the constant-current source 80 provides a constant current, the voltage measured by the voltmeter 65 depends on the resistance of the primary transfer roller 62. That is, the resistance of the primary transfer roller 62 is obtained from the voltage in the current path. The voltmeter 65 is configured to measure one or both of the voltages applied to the primary transfer roller 62 and the intermediate transfer belt 10.

The controller 70 includes a first corrector 71, a second corrector 72, and a third corrector 73. The first corrector 71 is configured to correct a value of the constant current (constant-current value) provided by the constant-current source 80 based on a detection result provided by the voltmeter 65 and thresholds for the measured voltage (first correction). The second corrector 72 is configured to correct the constant-current value based on environmental conditions (e.g., temperature and humidity) detected by the temperature and humidity detector 66 (second correction). The third corrector 73 sets the thresholds used by the first corrector 71 to match detected environmental conditions.

Therefore, the image forming apparatus 100 can adjust the primary transfer bias in response to the changes in the environmental condition and the changes in the resistance of the transferer 20 without reducing productivity.

Figure 3:
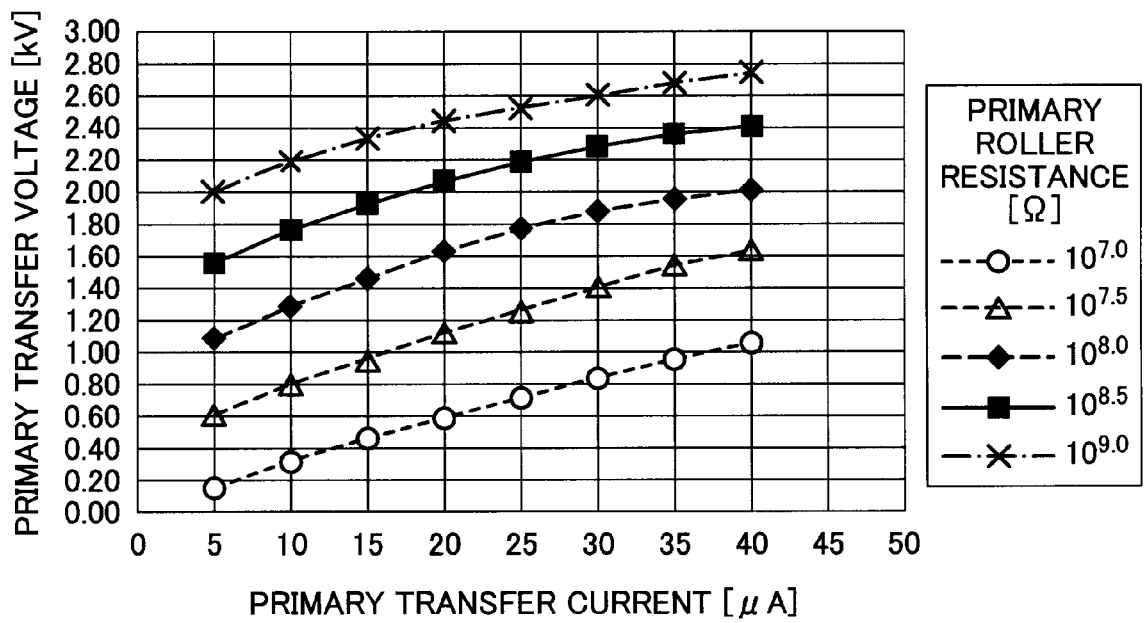
FIG. 3 is a graph illustrating a relation between a measured voltage and a resistance of a primary transfer roller when transfer current is changed.

The voltage applied to the primary transfer roller 62 in the constant-current control method was measured and the results thereof are shown in FIG. 3. In the voltage measurement (electrical characteristic value detection), the constant-current value was changed in a range from 5 μA to 40 μA and the resistance of the primary transfer roller 62 was set to $1\times10^{7.0}\Omega$, $1\times10^{7.5}\Omega$, $1\times10^{8.0}\Omega$, $1\times10^{8.5}\Omega$, and $1\times10^{9.0}\Omega$. Hereinafter the resistance of the primary transfer roller 62 is referred to as the primary roller resistance (PR). TABLE 1 shows sample voltages (DV) measured when the current value for the voltage measurement is 30 μA. The transfer voltage changes with the secondary roller resistance. As shown in TABLE 1, the higher the roller resistance, the higher the transfer voltage is.

TABLE 1

| PR (Ω) | DV (kV) |
|---|---|
| $1\times10^{7.0}$ | 0.82 |
| $1\times10^{7.5}$ | 1.4 |
| $1\times10^{8.0}$ | 1.88 |
| $1\times10^{8.5}$ | 2.28 |
| $1\times10^{9.0}$ | 2.6 |

Figure 4:
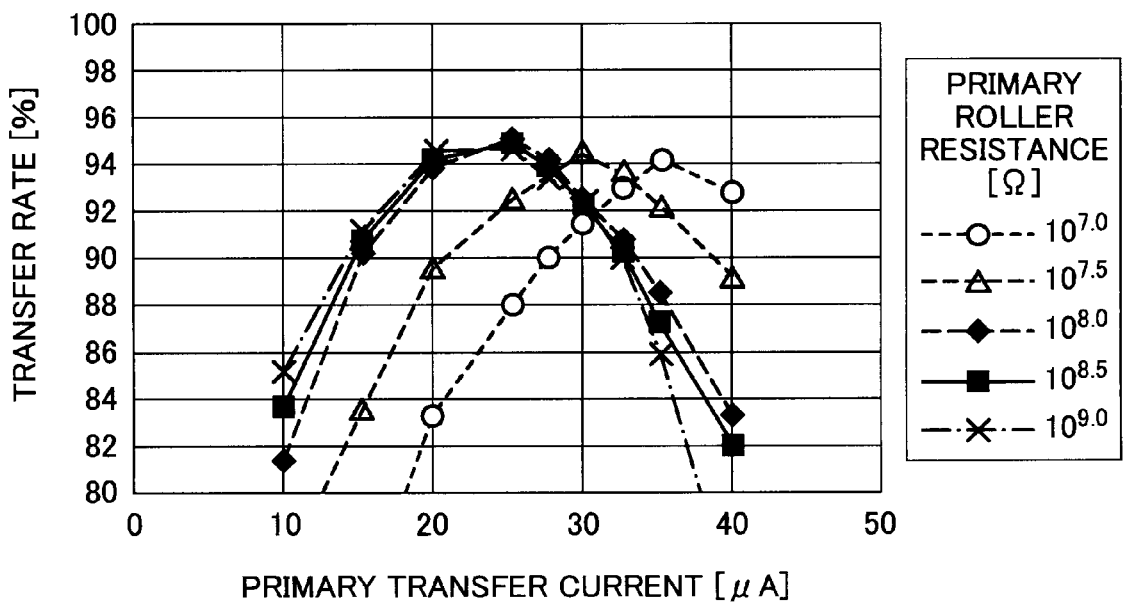
FIG. 4 is a graph illustrating a relation between the transfer current applied to the primary transfer roller and transfer rates.

Further, transfer rates were monitored when the constant-current value was changed in a range from 10 μA to 40 μA. The transfer rate is a ratio of the toner on the intermediate transfer belt 10 to the toner on the photoreceptor 40. The transfer rates are shown in FIG. 4. In the monitoring of the transfer rate, a pattern having a small image area ratio of 5% in a width direction was used.

As illustrated in FIG. 4, an optimum constant-current (optimum current value), with which the transfer rate is highest, changes with the primary roller resistance. TABLE 2 shows the optimum current value corresponding to the primary roller resistance.

TABLE 2

| RR (Ω) | Optimum current value (μA) |
|---|---|
| $1\times10^{7.0}$ | 35 |
| $1\times10^{7.5}$ | 30 |
| $1\times10^{8.0}$ | 25 |
| $1\times10^{8.5}$ | 25 |
| $1\times10^{9.0}$ | 25 |

Adjustments of the transfer current are described below. Referring to TABLE 2, when the standard primary roller resistance is set to $1\times10^{7.5}\Omega$, the optimum current value is 30 μA. When the primary roller resistance changes to $1\times10^{7.0}\Omega$, the optimum current value is increased by 5 μA to 35 μA. When the primary roller resistance changes to $1\times10^{8.0}\Omega$, the optimum current value is decreased by 5 μA to 25 μA.

When the primary roller resistance was $1\times10^{9.0}\Omega$, image failure was caused by a discharge phenomenon. TABLE 3 shows a relation among the constant-current value, the primary roller resistance, and image failure occurrence.

TABLE 3

| Current (μA) | RR (Ω) | | |
|---|---|---|---|
| | $1\times10^{8.0}$ | $1\times10^{8.5}$ | $1\times10^{9.0}$ |
| 20 | Good | Good | Good |
| 25 | Good | Good | Bad |
| 30 | Good | Bad | Bad |
| 35 | Good | Bad | Bad |

Referring to TABLE 3, the image failure occurrence when the primary roller resistance was $1\times10^{9.0}\Omega$ is described below.

When the constant-current value was 25 μA, image failure occurred and the image failure occurrence was ranked "Bad". However, the image failure was not observed and the image failure occurrence was ranked "Good" when the constant-current value was 20 μA. In FIG. 4, when the primary roller resistance was $1\times10^{9.0}\Omega$, the transfer rates when the constant-current value was 20 μA and 25 μA were similar to each other.

Therefore, the constant-current value is changed to 20 μA when the primary roller resistance was $1\times10^{9.0}\Omega$.

An amount of the constant current to be increased or decreased (adjustment amount) is determined by whether the measured voltage is lower or higher than each of the threshold voltages. TABLE 4 shows sample threshold voltages for the measured voltages when the current used in the voltage measurement is 30 μA. When the primary roller resistance is $1\times10^{7.0}\Omega$, the measured voltage was 0.82 kV as illustrated in TABLE 1 and is less than a threshold 1. When the primary roller resistance is $1\times10^{9.0}\Omega$, the measured voltage was 2.6 kV as shown in TABLE 1 and is greater than a threshold 3.

TABLE 4

| | |
|---|---|
| Threshold 1 | 1.0 kV |
| Threshold 2 | 1.6 kV |
| Threshold 3 | 2.4 kV |

TABLE 5 shows a relation between the threshold voltages and the adjustments of the constant-current value. In TABLE 5, the thresholds 1, 2, and 3 are shown as TH1, TH2, and TH3, respectively. Referring to TABLE 5, when the primary roller resistance is $1\times10^{7.0}\Omega$ with which the measured voltage (DV) is less than the threshold 1 (TH1), the constant-current value is increased by 5 μA to 35 μA from the current value for the voltage measurement, 30 μA. When the primary roller resistance is $1\times10^{9.0}\Omega$ with which the measured voltage (DV) is greater than the threshold 3 (TH3), the constant-current value is decreased by 10 μA to 20 μA. Thus, the current value is set to the optimum current value with which the transfer rate is highest as shown in TABLE 2.

TABLE 5

| | Adjustment amount (μA) | Constant-current value after correction (μA) |
|---|---|---|
| DV < TH1 | +5 | 35 |
| TH1 ≤ DV < TH2 | 0 | 30 |
| TH2 ≤ DV < TH3 | −5 | 25 |
| DV ≥ TH3 | −10 | 20 |

Figures 5, 6:
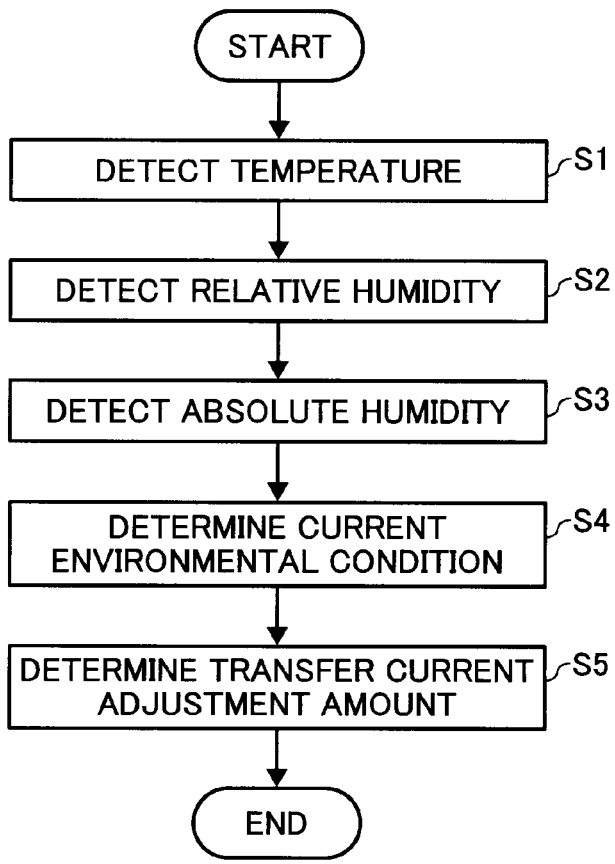
FIG. 5 shows examples of a relation between threshold voltages and adjustment amounts.
FIG. 6 is a flowchart illustrating adjustments of transfer current using an environment detector.

The first correction of the transfer current performed by the first corrector 71 are summarized in FIG. 5. As described above, the constant-current value can be set to the optimum current value, with which the transfer rate is highest, even if the primary roller resistance changes. Therefore, image failure can be prevented or reduced.

In the above description, the transfer bias is corrected in response to the changes in the resistance of the primary transfer roller 62. A similar effect can be obtained by correcting the transfer bias in response to the changes in the resistance of the intermediate transfer belt 10.

The image forming apparatus 100 can adjust the transfer current applied to the primary transferer with the second corrector 72 based on environmental conditions detected by the temperature and humidity detector 66. In an example embodiment, a temperature and humidity detector CHS-CSC-18 manufactured by TDK is used as a temperature and humidity detector 66. The temperature and humidity detector 66 includes a thermistor and a humidity sensor and detects temperature based on a thermistor output and humidity based on a humidity sensor output.

Temperature and humidity are detected every minute after the image forming apparatus 100 is powered on. The second correction of the transfer current based on environmental conditions is performed at the same cycle as or at a similar cycle to the cycle of the environment detection. It is preferable to install the temperature and humidity detector 66 at a position far from any heat source, for example, the fixer 25. In an example embodiment, the environment detector is provided near the manual tray 51, inside the image forming apparatus 100. Alternatively, the location of the temperature and humidity detector 66 may be, but is not limited to, beneath the sheet cassette 44. The image forming apparatus 100 stores a temperature conversion table in which the thermistor output value and the temperature are related to each other, a relative humidity conversion table in which the humidity sensor output value and relative humidity are related to each other, an absolute humidity conversion table, and an environmental condition determination table.

Referring to a flowchart shown in FIG. 6, a sequence of the second correction is described below. The temperature and humidity detector 66 detects the thermistor output. Temperature is determined based on the thermistor output and correlation in the temperature conversion table at S1.

The temperature and humidity detector 66 detects the humidity sensor output. Relative humidity is determined based on the temperature obtained at S1 and the relative humidity conversion table at S2. In the relative humidity conversion table, humidity may be stored in a row and the humidity sensor outputs may be stored in a column.

Further, absolute humidity is determined based on the relative humidity and the absolute humidity conversion table at S3. In the absolute humidity conversion table, relative humidity is stored in a row and temperature is stored in a column. Alternatively, the absolute humidity may be calculated based on the temperature and the relative humidity.

At S4, a current environmental condition is determined based on the absolute humidity obtained at S3 and the environmental condition determination table. Examples of the environmental condition include LL in which the temperature is 19° C. and the humidity is 30%, ML in which the temperature is 23° C. and the humidity is 30%, MM in which the temperature is 23° C. and the humidity is 50%, MH in which the temperature is 23° C. and the humidity is 80%, and HH in which the temperature is 27° C. and the humidity is 80%. It should be noted that the temperature, the humidity, and any combination thereof are not limited to the above-described values.

At S5, the transfer current value is corrected to match the environmental condition determined at S4. An adjustment amount of the transfer current is determined based on a relation shown in TABLE 6. In an example embodiment, α is 5 μA and β is 10 μA. Again, the relation between the current environmental condition and the adjustment amount is not limited to the above.

TABLE 6

| | Current environment | | | | |
|---|---|---|---|---|---|
| | LL | ML | MM | MH | HH |
| Adjustment amount | −α | −β | 0 | +β | +α |

The resistances of the primary transfer roller 62 and the intermediate transfer belt 10 change with the change in temperature and/or humidity. Therefore, it is effective to adjust the transfer bias corresponding to the output values of the temperature and humidity detector 66.

If the voltage applied to the primary transfer roller 62 is measured frequently, the change in the resistance of the primary transfer roller 62 caused by the change in the environmental condition is detectable. In such a case, the detection performed by the temperature and humidity detector 66 can be omitted. However, the image forming apparatus 100 performs a mechanical operation, for example, applying the constant-current to the primary transfer roller 62 for a certain time period, in the voltage measurement. Therefore, productivity may be reduced if the voltage is frequently detected. In contrast, because the environmental condition detection does not include a mechanical operation, productivity does not decrease even if the environment detection is performed frequently.

However, in the case in which both the voltage measurement and the environment detection are performed, the transfer bias may be adjusted redundantly relating to environmental conditions if the voltage is measured after environmental conditions change. Therefore, the third corrector 73 sets the threshold voltages used in the first correction of the transfer current to match the detected environmental condition.

Operations performed by the third corrector 73 are further described below.

Figure 7:
FIG. 7 is an illustration of adjustments of transfer current when threshold voltages are not changed to match a detected environmental condition.

When the environmental condition is HH (27° C./80%), the primary roller resistance decreases to $1 \times 10^{7.0} \Omega$ from $1 \times 10^{7.5} \Omega$ compared with a case in which the environmental condition is MM (23° C./50%). Accordingly, the optimum current value increases to 35 μA from 30 μA. If the threshold voltages are not changed to match the environmental condition, the constant-current is increased by 5 μA by the first corrector 71 and further increased by 5 μA by the second corrector 72 as illustrated in FIG. 7. As a result, the constant-current value is increased by 10 μA in total to 40 μA, which is not the optimum current value illustrated in FIG. 4.

Figure 8:
FIG. 8 is an illustration of adjustments of transfer current when the threshold voltages are changed to match a detected environmental condition.

By contrast, FIG. 8 illustrates a case in which the threshold voltages are changed by the third corrector 73 to match environmental conditions. The thresholds 1 though 3 for the environmental condition HH are set to lower values than the thresholds 1 though 3 for the environmental condition MM. When the voltage measured in the environmental condition HH is 900 V in the first correction, the measured value is greater than the threshold 1 and less than the threshold 2. Therefore, the constant-current value is set to 35 μA that is the optimum current value, because the amount corrected by the first corrector 71 is zero and the amount corrected by the second corrector 72 is +5 μA.

Therefore, the transfer bias can be adjusted appropriately in response to both of the change over time in the resistance of the primary transfer roller 62 and the changes in the environmental condition. Further, the frequency of the voltage measurement can be kept to a minimum.

As described above, the voltage measurement includes the mechanical operation. The voltage measurement may be performed while another adjustment is performed to reduce productivity loss. For example, a color copier like the image forming apparatus 100 according to an example embodiment generally performs operations to correct positional differences among the toner images of respective colors (color displacement). These operations to correct the color displacement (color displacement correction) are generally performed when image forming is not performed. Therefore, in an example embodiment, the voltage measurement is performed during the operations to correct the color displacement.

The operations to correct the color displacement are further described below.

Figure 9:
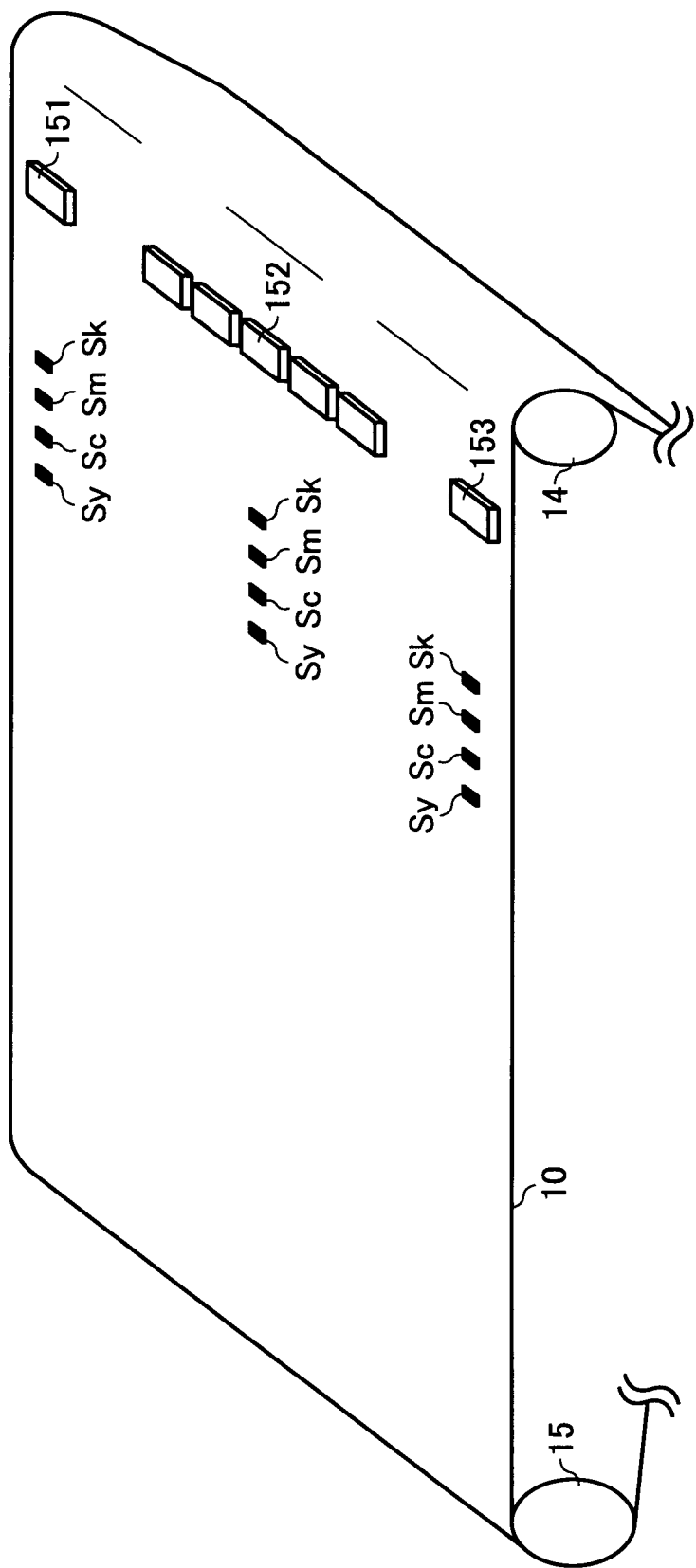
FIG. 9 is a diagram illustrating patch patterns and a location of P sensors.

The operations to correct the color displacement include forming a patch pattern in a center portion and a first and a second end portions of the intermediate transfer belt 10 in a width direction thereof as illustrated in FIG. 9. Each of the three patch patterns include reference toner images Sy, Sm, Sc, and Sk that are for yellow, magenta, cyan, and black, respectively. The reference toner images Sy, Sm, Sc, and Sk are arranged in a sub-scanning direction at equal or similar intervals. The reference toner images Sy, Sm, Sc, or Sk of same color are arranged in line in a main scanning direction.

Referring to FIG. 9, the image forming apparatus 100 further includes end P sensors 151 and 153 and center P sensors 152. The end P sensors 151 and 153 detect the patch patterns formed in the first and the second end portions of the intermediate transfer belt 10 in the width direction, respectively. The center P sensor 152 detects the patch pattern formed in the center portion of the intermediate transfer belt 10 in the width direction.

When the reference toner images Sy, Sm, Sc, and Sk are formed at proper timing, the reference toner images Sy, Sm, Sc, and Sk are detected at equal or similar intervals. However, if the reference toner images Sy, Sm, Sc, and Sk are not formed at proper timing, the reference toner images Sy, Sm, Sc, and Sk are formed at different intervals. Accordingly, the reference toner images Sy, Sm, Sc, and Sk are detected at different intervals.

Further, when there is no color displacement in optical writing by the optical system, the reference toner images of the same color in the three patch patterns are detected simultaneously. If there is color displacement in optical writing by the optical system, the reference toner images of the same color in the three patch patterns are detected at different times. The controller 70 adjusts the optical system based on the intervals and/or the timing at which the reference toner images Sy, Sm, Sc, and Sk are detected in the main scanning direction and/or sub-scanning direction to correct the color displacement.

In the foregoing description, the voltage measurement is performed during the operations to correct the color displacement. Alternatively, the voltage measurement may be performed during image density adjustment.

Generally, a color copier like the image forming apparatus 100 according to an example embodiment performs image density adjustment including detecting an amount of toner adhered on an intermediate transfer belt (toner adhesion amount) and adjusting the image density based on the results of the detection to optimize the density of respective color images. These operations are often performed during a time period dedicated thereto while image forming is not being performed.

Operations performed in the image density adjustment are further described below.

In an example embodiment, the image density adjustment is performed when the image forming apparatus 100 is powered on and each time after a predetermined number of sheets are printed. In the adjustment, a reference pattern is formed on each of the photoreceptors 40Y, 40M, 40C, and 40K. The reference pattern has a continuous tone that is obtained by gradually changing a charging bias and a developing bias. In an example embodiment, a liner reference pattern in which the toner adhesion amount changes gradually is formed on the photoreceptor 40 along a moving direction of the surface thereof. The reference pattern is transferred onto the intermediate transfer belt 10. The transferred reference pattern is detected by a P sensor, not shown, provided at a position facing the surface of the intermediate transfer belt 10 onto which the reference pattern is transferred.

The controller 70 compares a detection result by the P sensor with a predetermined or desirable target toner adhesion amount. The controller 70 functions as an image density controller and changes image forming conditions based on the results of the above comparison to adjust the image density of each color. The image forming conditions to adjust the image density include an intensity of the laser light, the charging bias applied to the charger 18, the developing bias applied to the developing sleeve, and an amount of toner supplied to the developing unit 61.

As described above, the image density adjustment includes changing the image forming conditions based on the detected toner adhesion amount. The timing of the voltage measurement and the transfer current correction during the image density adjustment is described below. It is assumed that the toner adhesion amount is detected on the intermediate transfer belt 10 after the reference pattern is transferred thereto.

When the resistance of the primary transferer changes, the primary transfer efficiency decreases. That is, the toner adhesion amount is decreased. Therefore, the image density adjustment is performed and the image forming conditions are changed to increase the toner adhesion amount to a desirable amount. If the transfer current is changed based on the voltage measurement to increase the primary transfer efficiency in this state, the image density becomes excessive because the image forming conditions are already changed to increase the toner adhesion amount.

Therefore, the voltage measurement and the transfer current correction are performed before the image forming conditions are changed during the image density adjustment. More specifically, the voltage measurement and the transfer current correction are performed before the reference patterns are transferred onto the intermediate transfer belt 10, because the transfer rate may differ after the transfer current correction. By adjusting the image forming conditions after the reference patterns are transferred onto the intermediate transfer belt 10 with a proper transfer current, the image density can be properly adjusted.

As described above, by changing the threshold voltages with the third corrector 73, the first corrector 71 can correct the transfer current in response to the change over time in the resistance of the transferer 20, excluding effects caused by the environmental change. Because the second corrector 72 can correct the transfer current in response to the environmental change in addition to the correction performed by the first corrector 71, the transfer current applied to the primary transferer can be properly adjusted in total.

In the first correction, when the measured voltage is less than the threshold voltage, the transfer current is increased from the constant-current value used in the voltage measurement. When the measured voltage is greater than the threshold voltage, the transfer current is decreased from the constant-current value used in the voltage measurement. Therefore, an optimum transfer bias with which transfer efficiency is highest is selected even if the resistance of the primary transferee changes. By performing the electrical characteristic detection during another correction or adjustment operation, productivity loss caused by the voltage measurement can be reduced.

In an example embodiment, at least resistance of the primary transferer is detected. Therefore, fluctuation of transfer efficiency cased by changes in image area can be prevented or reduced. Further, image failure cased by current leakage can be prevented or reduced.

Although the voltage is measured as the electrical characteristic value corresponding to the resistance of the primary transferer in the description above, alternatively, an electrical current value may be measured as an electrical characteristic value in a constant-voltage control method.

Figure 10:
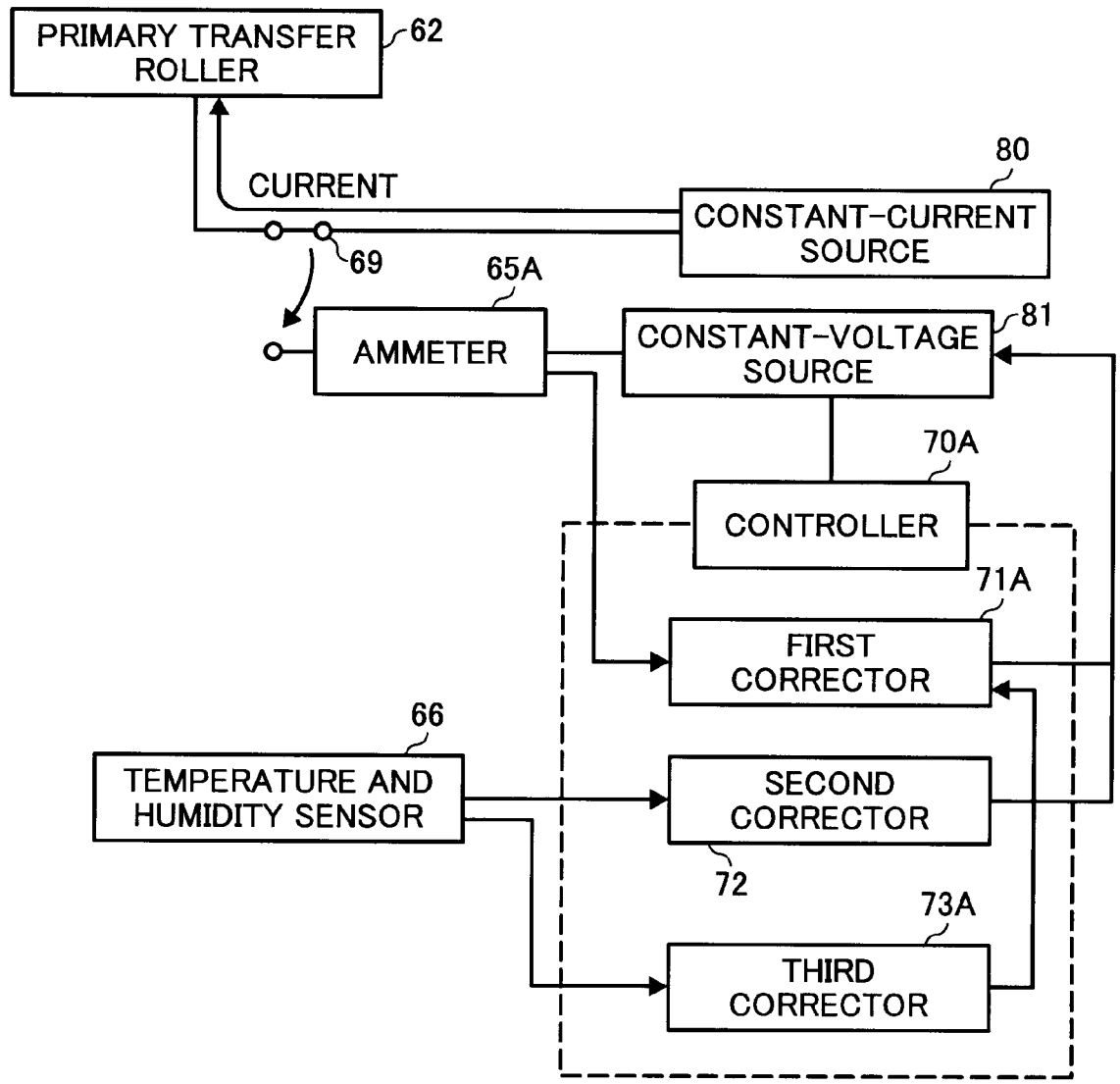
FIG. 10 is a control block diagram for a primary transfer bias.

FIG. 10 illustrates a control block for the primary transfer bias in which a constant-current source is used in image forming and a constant-voltage source is used in detecting the current as the electrical characteristic value corresponding to the resistance of the primary transferer. In FIG. 10, the control block includes a primary transfer roller 62, a constant-current source 80, a constant-voltage source 81, a switch member 69, and a controller 70A. The controller 70A includes a first corrector 71A, a second corrector 72, and a third corrector 73A.

In FIG. 10, each component that is identical or similar to each component shown in FIG. 2 is given the same reference numeral and a description thereof omitted. In FIG. 10, an ammeter 65A is used instead of the voltmeter 65 shown in FIG. 2. One terminal of the ammeter 65A connects to the constant-voltage source 81 and the other terminal thereof connects to the switch 69.

The switch member 69 connects the primary transfer roller 62 and the constant-current source 80 during image forming, and thus a bias controlled in a constant-current control method is applied to the primary transfer roller 62. The switch member 69 connects the primary transfer roller 62 and the constant-voltage source 81 during electrical characteristic value detection, and thus a bias controlled in a constant-voltage method is applied to the primary transfer roller 62. The ammeter 65A measures a current value in a current path from the constant-voltage source 81 to the primary transfer roller 62.

Because the constant-voltage source 81 provides a constant voltage, the current value measured by the ammeter 65A depends on the resistance of the primary transferee. Therefore, the measured current value can be regarded as an electrical characteristic value.

The first corrector 71A corrects the constant-current value provided by the constant-current source 80 based on a current value measured by the ammeter 65A and predetermined or desirable thresholds for the measured current value. The second corrector 72 corrects the constant-current value based on environmental conditions detected by the temperature and humidity detector 66. The third corrector 73 sets the thresholds used by the first corrector 71A to match the detected environmental condition.

When an image forming apparatus includes a constant-current source for forming a transfer electrical field, cost can be lower and space inside the image forming apparatus can be smaller by using the constant-current source to detect an electrical characteristic value and measuring voltage in a constant-current control method than by further including a constant-voltage source to detect an electrical characteristic value and measuring current in a constant-voltage method.

Effects of the resistance of a toner layer in the primary transfer process are larger than in the secondary transfer process because the resistance of the sheet is not included, and thus transfer efficiency is more likely to decrease when the resistance of the primary transferer is lower. Therefore, adjusting the primary transfer bias is effective. Further, using the intermediate transfer belt 10 can prevent or reduce color displacement and/or fluctuation in transfer efficiency caused by the thickness, the type, etc., of a sheet.

With the configuration described above, the primary transfer current is corrected in response to the change over time in the resistance of the primary transferee based on electrical characteristic detection and thresholds. Effects of the environmental conditions can be excluded in the first correction based on the electrical characteristic detection because the thresholds are set based on environment detection. Further, the primary transfer current is adjusted in response to changes in environmental conditions. Therefore, the primary transfer current can be set to an optimum value corresponding to the change over time in the resistance of the primary transferer and changes in environmental conditions.

In an example embodiment, a constant-current value can be properly adjusted even if the resistance of the primary transferer changes significantly because a plurality of thresholds is used to determine the change amount of the constant-current value. Therefore, a toner image can be transferred in an optimum condition on a constant basis. Moreover, both a decrease in transfer efficiency that occurs when the resistance of the primary transferer is lower and an electrical current leakage that occurs when the resistance of the primary transferer is higher can be remedied.

In an example embodiment, the transfer bias for the secondary transferer 22 that is configured to transfer a toner image from the intermediate transfer belt 10 to a sheet is adjusted, as described below.

In the secondary transfer process, sheet size affects transfer efficiency, and the value of the constant-current required for optimum transfer efficiency depends on the sheet size. In particular, the size of sheet in a width direction, which is a direction perpendicular to the sheet transport direction, affects transfer efficiency. When a toner image is transferred onto a sheet that is smaller than a maximum sheet size that the image forming apparatus 100 can handle, the electrical current that primarily flows through the sheet is partially deflected in other directions due to the resistance of the sheet by effects of the transfer bias applied by the secondary transferer 22. As a result, a sufficient amount of the electrical current does not flow through the sheet, which causes a decrease in transfer rate. That is, the transfer rate may be lower in the case of a sheet having a smaller width than in the case of a sheet having a larger width, even if the same level of constant-current is applied to the secondary transferee 22.

Figure 11:
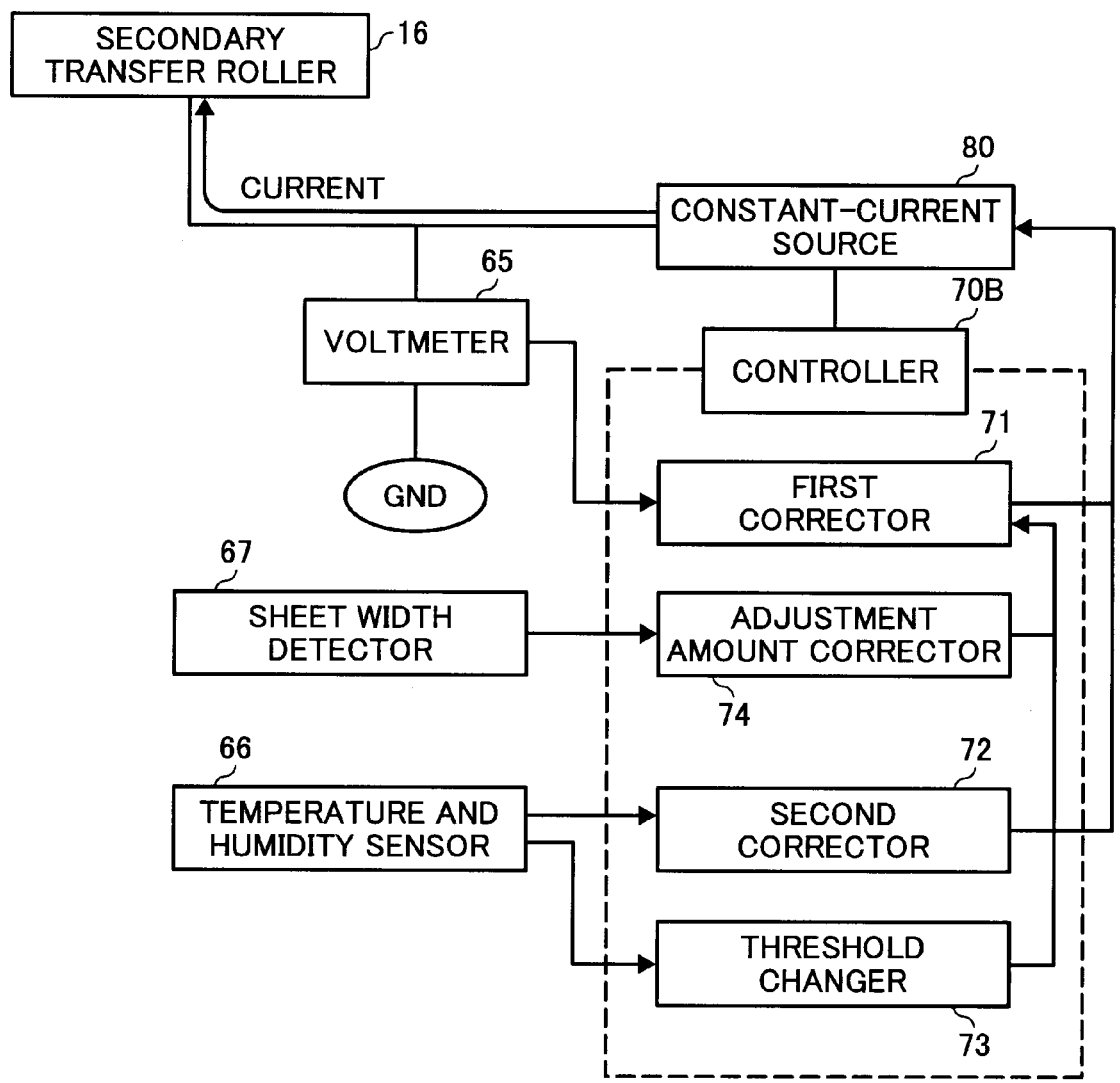
FIG. 11 is a control block diagram for a secondary transfer bias.

FIG. 11 illustrates a control block for the transfer bias applied to the secondary transferer 22 (secondary transfer bias). As illustrated in FIG. 11, the control block includes the secondary transfer roller 16, a voltmeter 65, a temperature and humidity detector 66, a sheet width detector 67, a constant-current source 80, and a controller 70B. The controller 70B includes a first corrector 71, a second corrector 72, a third corrector 73, and an adjustment amount corrector 74. In FIG. 11, each component that is identical or similar to each component shown in FIG. 2 is given the same reference numeral and the description thereof thus omitted.

The constant-current source 80 applies a secondary transfer bias to the secondary transfer roller 22 in a constant-current control method. The voltmeter 65 measures a voltage in a current path from the constant-current source 80 to the secondary transfer roller 16. Because the resistance of the secondary transferee 22 can be obtained from the measured voltage, the measured voltage is regarded as an electrical characteristic value corresponding to the resistance. The resistance of the secondary transferer 22 can be obtained by detecting one or both of the voltages applied to the secondary transfer roller 16 and the intermediate transfer belt 10.

The sheet width detector 67 is configured to detect a width of a sheet that is perpendicular to the sheet transport direction. The sheet width detector 67 may be provided in each of the sheet cassette 44. Alternatively, the sheet width detector 67 may be provided to detect a width of a sheet in the sheet transport path.

The first corrector 71 corrects the constant-current value (secondary transfer current) based on the voltage detected by the voltmeter 65 and thresholds for the measured voltage. The adjustment amount corrector 74 is configured to adjust an adjustment amount corrected by the first corrector 71 based on the width of the sheet detected by the sheet width detector 67. The second corrector 72 corrects the constant-current value based on environmental conditions detected by the temperature and humidity detector 66. The third corrector 73 sets the thresholds used by the first corrector 71 to match a detected environmental condition.

Figure 12:
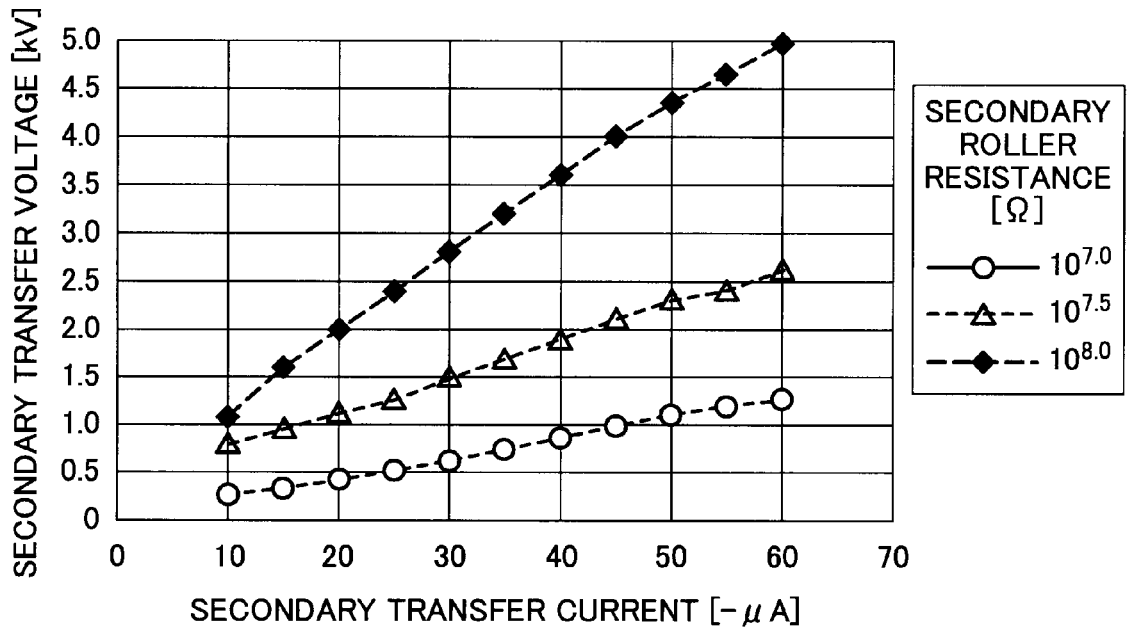
FIG. 12 is a graph illustrating a relation between a measured voltage and a resistance of a secondary transfer roller when a constant-current value is changed.

The voltage applied to the secondary transfer roller 16 in a constant-current control method was measured and the results thereof are shown in FIG. 12. In the voltage measurement, the constant-current value was changed in a range from $-10\,\mu A$ to $-60\,\mu A$ and the resistance of the secondary transfer roller 16 was set to $10^{7.0}\,\Omega$, $10^{7.5}\,\Omega$, and $10^{8.0}\,\Omega$. Hereinafter the resistance of the secondary transfer roller 16 is referred to as the secondary roller resistance (SR).

TABLE 7 shows sample voltages measured (DV) when the current value for the voltage measurement is $-30\,\mu A$. The transfer voltage changes with the roller resistance. As shown in TABLE 1, the higher the secondary roller resistance, the higher the secondary transfer voltage is.

TABLE 7

| SR (Ω) | DV (kV) |
| --- | --- |
| $1 \times 10^{7.0}$ | 0.6 |
| $1 \times 10^{7.5}$ | 1.4 |
| $1 \times 10^{8.0}$ | 2.8 |

Figure 13:
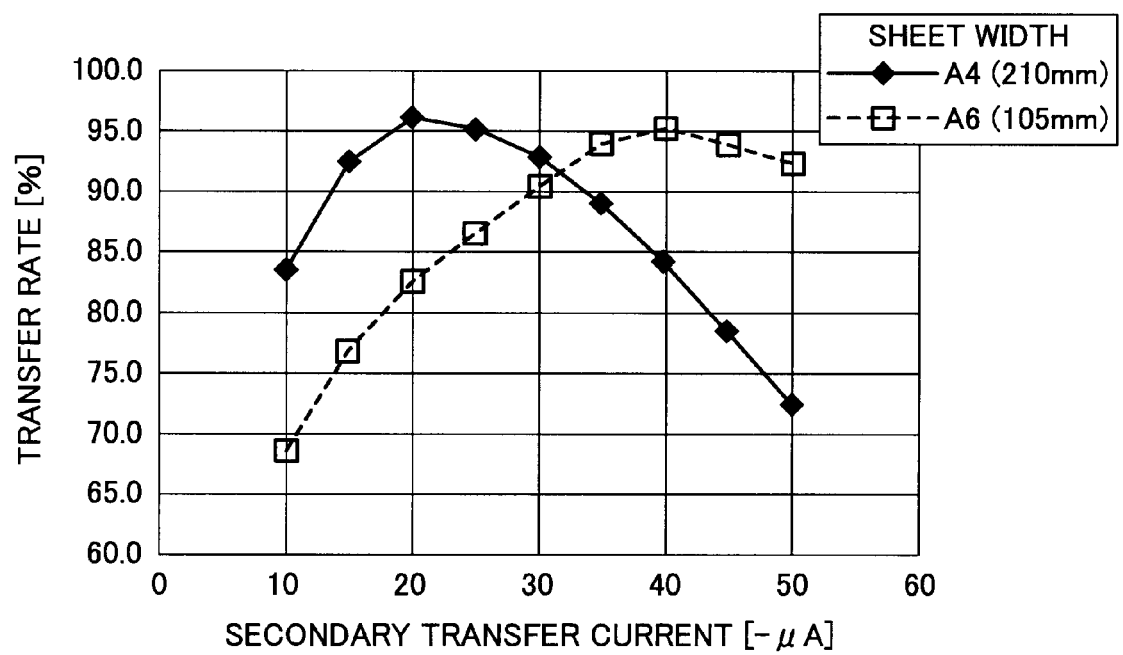
FIG. 13 is a graph illustrating relations between transfer current and transfer rates for an A4-sized sheet and an A6-sized sheet when a roller resistance is $1\times10^{7.0}\Omega$.
Figure 14:
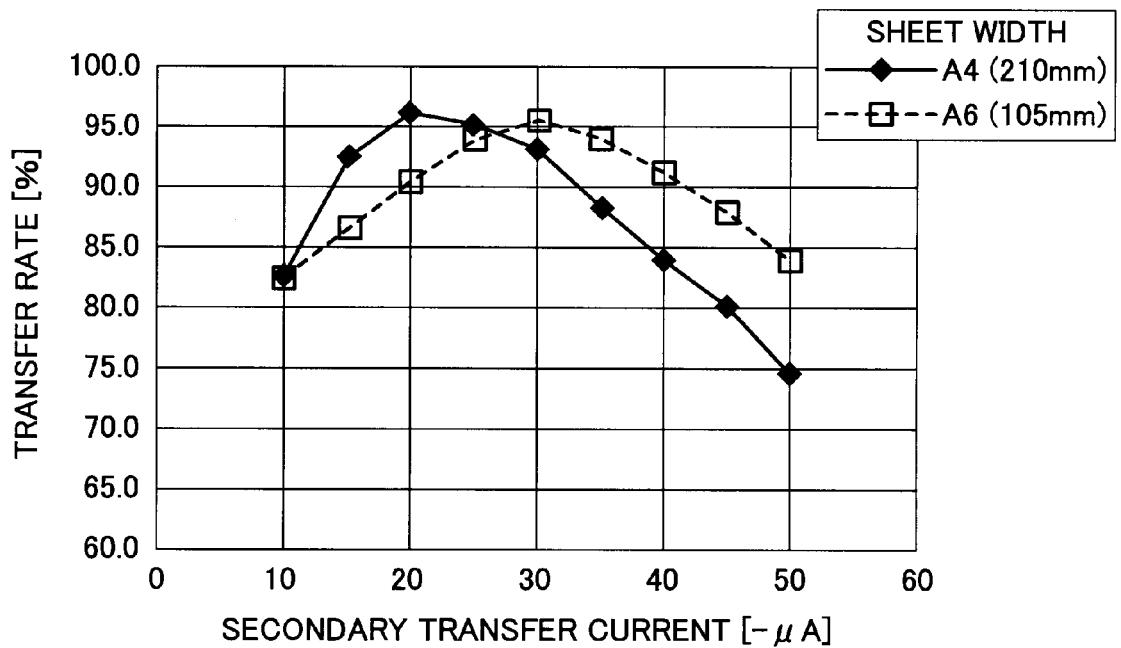
FIG. 14 is a graph illustrating relations between transfer current and transfer rates for an A4-sized sheet and an A6-sized sheet when a roller resistance is $1\times10^{7.5}\Omega$.
Figure 15:
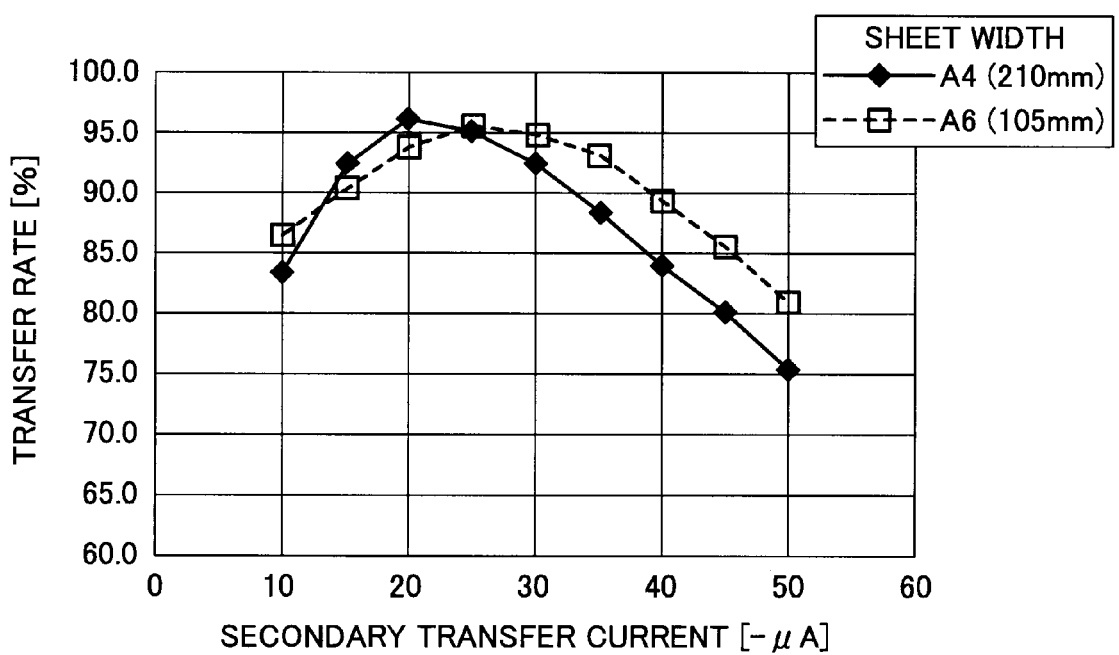
FIG. 15 is a graph illustrating relations between transfer current and transfer rates for an A4-sized sheet and an A6-sized sheet when a roller resistance is $1\times10^{8.0}\Omega$.

Further, secondary transfer rates were monitored when the constant-current value was changed in a range from $-10\,\mu A$ to $-50\,\mu A$ and the secondary roller resistance was set to $10^{7.0}\,\Omega$, $10^{7.5}\,\Omega$, and $10^{8.0}\,\Omega$. The secondary transfer rate is a ratio of the toner on the sheet to the toner on the intermediate transfer belt 10. The transfer rates obtained with the secondary roller resistance of $10^{7.0}\,\Omega$, $10^{7.5}\,\Omega$, and $10^{8.0}\,\Omega$ are shown in FIGS. 13, 14, and 15, respectively. In the monitoring of the secondary transfer rates, two different sheets of A4 size and A6 size were used to examine differences in the secondary transfer rates depending on the sheet sizes. A4-sized sheets were used with the longer side thereof (297 mm) in the width direction and are hereinafter referred to as the A4Y sheets. A6-sized sheets were used with the shorter side thereof (105 mm) in the width direction, and are hereinafter referred to as the A6T sheets.

For example, the difference in the secondary transfer rates between A4Y sheets and A6T sheets was as large as $20\,\mu A$ when the secondary roller resistance is $10^{7.0}\,\Omega$, as illustrated in FIG. 13. However, the difference was as small as $5\,\mu A$ when the secondary roller resistance is $10^{8.0}\,\Omega$, as illustrated in FIG. 15.

Because the effects of sheet size depend on the secondary roller resistance as described above, the constant-current value may not be optimum when the secondary roller resistance changes if the secondary transfer current is corrected based only on the sheet size. Therefore, it is preferable to correct the secondary transfer current based on the secondary roller resistance as well as the sheet size.

The adjustment amount corrector 74 adjusts an amount of the secondary transfer current corrected by the first corrector 71 so that the secondary transfer current for A6T sheets is set to equal to or greater than an optimum transfer current for A4Y sheets. For example, when the secondary roller resistance is $10^{7.0}\,\Omega$, the secondary transfer rate on A4Y sheets is highest when the constant-current value is $-20\,\mu A$ and the secondary transfer rate on A6T sheets is highest when the transfer current is $-40\,\mu A$. Therefore, when A6T sheets are used, the transfer current is set to twice (200%) the optimum transfer current of –20 μA for A4Y sheets that is referred to as the sheet size adjustment coefficient. As illustrated in TABLE 8, the sheet size adjustment coefficient depends on the secondary roller resistance.

TABLE 8

| SR (Ω) | Optimum current value (–μA) | | Sheet size adjustment coefficient |
|---|---|---|---|
| | A4Y | A6T | |
| $1 \times 10^{7.0}$ | –20 μA | –40 μA | 200% |
| $1 \times 10^{7.5}$ | –20 μA | –30 μA | 150% |
| $1 \times 10^{8.0}$ | –20 μA | –25 μA | 125% |

The sheet size adjustment coefficient is determined according to whether the measured voltage shown in FIG. 12 or TABLE 7 is higher or lower than each of the threshold voltages. TABLE 9 shows sample threshold voltages when the constant-current value for the voltage measurement is set to –30 μA. When the secondary roller resistance is $1 \times 10^{7.0} \Omega$, the measured voltage was 0.6 kV as shown in TABLE 7 and is greater than a threshold 1 and less than a threshold 2. When the secondary roller resistance is $1 \times 10^{8.0} \Omega$, the measured voltage was 2.8 kV as shown in TABLE 7 and is greater than a threshold 3 and less than a threshold 4.

TABLE 9

| Threshold 1 | 0.5 kV |
|---|---|
| Threshold 2 | 1.0 kV |
| Threshold 3 | 2.0 kV |
| Threshold 4 | 3.0 kV |

TABLE 10 shows a relation between the threshold voltages and the adjustment amount of the secondary transfer current for A6T sheets having a width of 105 mm. In TABLE 10, the thresholds 1, 2, 3, and 4 are shown as TH1, TH2, TH3, and TH4, respectively. When the roller resistance is $1 \times 10^{7.0} \Omega$ and the measured voltage (DV) is between the threshold 1 (TH1) and the threshold 2 (TH2), the sheet size adjustment coefficient is 200%, and thus the secondary transfer current is set to –40 μA that is the optimum transfer current shown in TABLE 8. When the roller resistance is $1 \times 10^{8.0} \Omega$ and the measured voltage (DV) is between the threshold 3 (TH3) and the threshold 4 (TH4), the sheet size adjustment coefficient is 125%, and thus the secondary transfer current is set to –25 μA that is the optimum transfer current shown in TABLE 8.

TABLE 10

| | Sheet size adjustment coefficient |
|---|---|
| DV < TH1 | 250% |
| TH1 ≤ DV < TH2 | 200% |
| TH2 ≤ DV < TH3 | 150% |
| TH3 ≤ DV < TH4 | 125% |
| DV ≥ TH4 | 100% |

Although the cases of A4Y sheets and A6T sheets are described above, adjustments of the transfer current using other sheets each having a width between the width of A4Y sheets and the width of A6T sheets were performed in an experiment. In the experiment, the sheet size adjustment coefficients were between the sheet size adjustment coefficients for A4Y sheets and A6T sheets. For example, A5-sized sheets are used with the shorter size (148.5 mm) in the width direction (A5T sheets). When the sheet size adjustment coefficient of the secondary transfer current for A6T sheets is 200% to the optimum current value for A4Y sheets, the sheet size adjustment coefficient for A5T sheets is greater than 100% and less than 200%. It is preferable to prepare a table of the sheet size adjustment coefficients according to the threshold voltages like TABLE 10 for each sheet size to be used.

By performing the above-described adjustments, an optimum current value can be selected according to the sheet size even if the secondary roller resistance changes.

If the detection of the secondary roller resistance is performed during image forming and the sheet is in contact with the secondary transferer 22, the detected secondary roller resistance may not be accurate because the voltage changes depending on the size of the image and the amount of toner to be transferred. Further, if detection of the secondary roller resistance is performed while image forming is not performed, a sheet is transported through the image forming apparatus only for the detection and thus wasted. In view of the above, it is preferable to detect the secondary roller resistance when the sheet is not present in the area between the secondary transfer roller 16 and the roller 9 to obtain an accurate resistance.

The environment detection performed by the temperature and humidity detector 66 is similar to the environment detection performed in adjustments of the primary transfer current and the descriptions thereof thus omitted.

The second corrector 72 corrects the secondary transfer current based on sheet sizes and current environmental conditions detected by the temperature and humidity detector 66. For example, when A6T sheets are used, an environmental correction coefficient is 100% for the environmental condition MM and 125% for the environmental condition HH. The relation between the adjustment amount of the secondary transfer current and the current environmental condition is preliminarily set for each sheet size to be used.

Because the resistance of the secondary transferer 22 depends on environmental conditions, the optimum transfer bias depends on environmental conditions. Therefore, adjusting the secondary transfer bias corresponding to an output of the temperature and humidity detector 66 is effective.

As described above, when the voltage measurement is performed frequently, productivity is reduced although the environment detection can be omitted. By contrast, detecting environmental conditions with the temperature and humidity detector 66 frequently does not reduce productivity.

However, when the secondary transfer bias is corrected based on both of the voltage measurement and the environment detection, the secondary transfer bias may be corrected redundantly relating to environmental conditions if the voltage is detected after the environmental condition changes. Therefore, the third corrector 73 sets the threshold voltages used by the first corrector 71 to match environmental conditions.

Operations performed by the third corrector 73 are further described below.

For example, when temperature is 23° C. and humidity is 50% (MM), the voltage measured under conditions of a secondary roller resistance of $1 \times 10^{7.5} \Omega$ and a constant-current value of –30 μA was 1.5 kV. The sheet size adjustment coefficient for A6T sheets was 150%. When temperature is 27° C. and humidity is 80% (HH), the secondary roller resistance was $1 \times 10^{7.1} \Omega$. The voltage measured with a constant-current value of –30 μA under these conditions was 0.8 kV. The sheet size adjustment coefficient for A6T sheets was 190%.

Figure 16:
FIG. 16 is an illustration of adjustments of transfer current when threshold voltages are not changed to match a detected environmental condition.

FIG. 16 illustrates a case in which the secondary transfer current is corrected without changing the threshold voltages to match environmental conditions. Referring to FIG. 16, the secondary transfer current is doubled (200%) based on the voltage (0.8 kV) measured under the environmental condition HH and the relation between the threshold voltages and the adjustment amount for A6T sheets shown in TABLE 10. In addition, the secondary transfer current is increased by 125% based on the output of the temperature and humidity detector 66. That is, the secondary transfer current for A6T sheets under a temperature of 27° C. and a humidity of 80% is set to 250% (2×1.25=2.5) of the secondary transfer current for A4Y sheets under a temperature of 23° C. and a humidity of 50% (MM) in total.

The current value corrected as above differs greatly from the current value based on the proper correction coefficient of 190% for A6T sheets under the environmental condition HH. If the secondary transfer current is corrected without changing the threshold voltages to match environmental conditions, the constant-current source 80 provides an excessive amount of current under the environmental condition HH, resulting in a decrease in transfer efficiency.

Figure 17:
FIG. 17 is an illustration of adjustments of transfer current when the threshold voltages are changed to match a detected environmental condition.

By contrast, FIG. 17 illustrates a case in which the threshold voltages are changed to match environmental conditions and the secondary transfer current is corrected with the changed threshold voltages. The threshold voltages under the environmental condition HH are lower than the threshold voltages under the environmental condition MM. Referring to FIG. 17, the voltage measured under the environmental condition HH is 0.8 kV, which is greater than the threshold 2 and less than the threshold 3. Based on the relation between the threshold voltages and adjustment amounts of the secondary transfer current for A6T sheets, the secondary transfer current is set to 150% of the original value in the correction based on the voltage measurement. In addition, the secondary transfer current is increased by 125% based on the output from the temperature and humidity detector 66. That is, the secondary transfer current for A6T sheets under a temperature of 27° C. and a humidity of 80% is increased by 188% (1.5×1.25≈1.88) in total, which is almost equal to the proper sheet size adjustment coefficient of 190% for A6T sheets under a temperature of 27° C.

Therefore, the secondary transfer current can be adjusted properly for each sheet size corresponding to changes in the resistance caused by the changes in environmental conditions. Further, the frequency of the voltage detection can be kept to a minimum.

As described above, the voltage measurement may be performed when another adjustment is performed, to reduce productivity loss because the voltage measurement includes the mechanical operation. Thus, for example, the voltage measurement may be performed when color displacement correction or image density adjustment is performed, similarly to the voltage measurement in the adjustment of the primary transfer current.

Although the voltage is measured as the electrical characteristic value corresponding to the resistance of the secondary transferer 22 in the description above, alternatively, an electrical current value may be measured as an electrical characteristic value in a constant-voltage control method.

Figure 18:
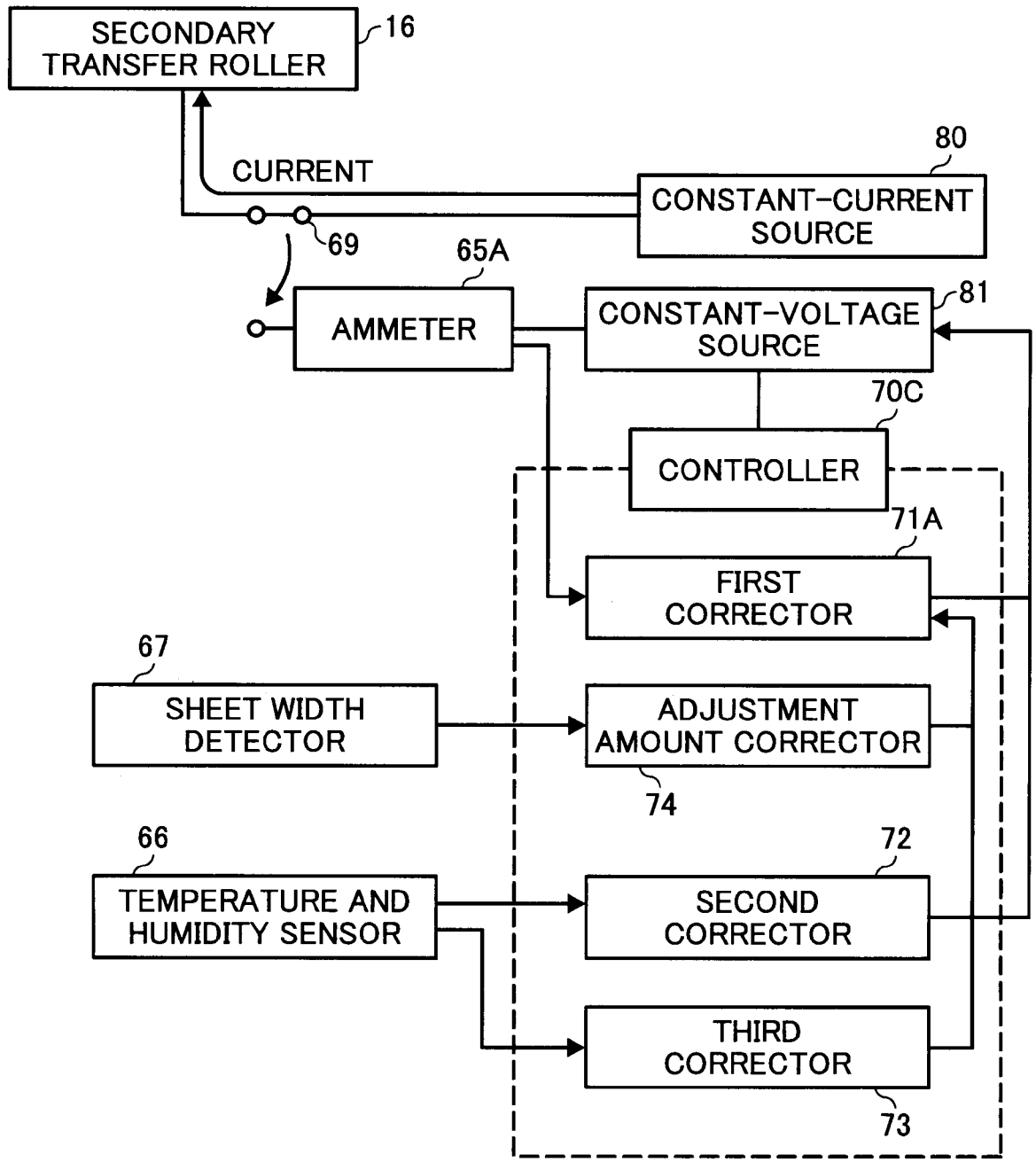
FIG. 18 is a control block diagram for a secondary transfer bias.

FIG. 18 illustrates a control block for the secondary transfer bias in which a constant-current source is used in image forming and a constant-voltage source is used in detecting the current as the electrical characteristic value. In FIG. 18, the control block includes a secondary transfer roller 16, a constant-current source 80, a constant-voltage source 81, a switch member 69, and a controller 70C. The controller 70C includes a first corrector 71A, a second corrector 72, a third corrector 73, and an adjustment amount corrector 74. In FIG. 18, an ammeter 65A is used instead of the voltmeter 65 shown in FIG. 11.

In FIG. 18, each component that is identical or similar to each component shown in FIG. 10 or 11 is given the same reference numeral and the description thereof omitted.

The switch member 69 connects the secondary transfer roller 16 to the constant-current source 80 during image forming, and thus a bias controlled in a constant-current control method is applied to the secondary transfer roller 16. The switch member 69 connects the secondary transfer roller 16 to the constant-voltage source 81 during electrical characteristic value detection, and thus a bias controlled in a constant-voltage method is applied to the secondary transfer roller 16. The ammeter 65A measures a current value in a current path from the constant-voltage source 81 to the secondary transfer roller 16.

Because the constant-voltage source 81 provides a constant voltage, the current value measured by the ammeter 65A depends on the resistance of the secondary transferer 22. Therefore, the measured current value can be regarded as an electrical characteristic value.

With the configuration described above, the secondary transfer current is adjusted in response to the change over time in the resistance of the secondary transferer 22 based on electrical characteristic detection and thresholds. In the first correction based on the electrical characteristic detection, an adjustment amount of the secondary transfer current is determined for each sheet size. Effects of the environmental conditions can be excluded in the first correction based on the electrical characteristic detection because the thresholds are set based on environment detection. Further, the secondary transfer current is corrected in response to changes in environmental conditions. Therefore, the secondary transfer current can be set to a value corresponding to the change over time in the resistance of the secondary transferer 22, environmental conditions, and sheet size.

Thus, the image forming apparatus 100 can form high quality images because the transfer bias is set to an optimum value as described above.

As can be appreciated by those skilled in the art, although the description above concerns the intermediate transfer method, the above-described control of the transfer bias may be used in a direct transfer method in which a toner image on a photoreceptor is transferred directly onto a sheet of recording medium.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image forming apparatus, comprising:
an image carrier configured to carry a toner image thereon;
a transferer configured to apply a bias that is controlled in a constant-current control method to a transfer medium to form a transfer electric field in a transfer area in which the image carrier and the transfer medium face each other to transfer the toner image onto the transfer medium;
a constant-current source configured to apply an electrical current to the transferer;
an electrical characteristic detector configured to detect an electrical characteristic value corresponding to a resistance in a conductor connecting the constant-current source to the transferer and through which the electrical current flows to the transferer;

an environment detector configured to detect an environmental condition inside the image forming apparatus;
a first corrector configured to correct a value of the electrical current based on a detection result produced by the electrical characteristic detector and a predetermined threshold;
a second corrector configured to correct the value of the electrical current based on a detection result produced by the environment detector; and
a third corrector configured to set the threshold based on the detection result produced by the environment detector,
wherein when correction by the first corrector and correction by the second corrector are performed simultaneously, the first corrector corrects the value of the electrical current using the threshold set by the third corrector.

2. The image forming apparatus of claim 1, further comprising:
a sheet width detector configured to detect a width of the transfer medium in a direction perpendicular to a transport direction thereof; and
an adjustment amount corrector configured to adjust an amount of the electrical current corrected by the first corrector based on a detection result produced by the sheet width detector.

3. The image forming apparatus of claim 1, wherein the first corrector sets the value of the electrical current to a higher value than the value of the electrical current applied to detect the electrical characteristic value when the detected electrical characteristic value is lower than the threshold.

4. The image forming apparatus of claim 1, wherein the first corrector sets the value of the electrical current to a lower value than the value of the electrical current applied to detect the electrical characteristic value when the detected electrical characteristic value is higher than the threshold.

5. The image forming apparatus of claim 1, wherein the electrical characteristic detector detects at least a resistance of the transferer.

6. The image forming apparatus of claim 5, wherein the electrical characteristic value comprises a voltage of the transferer and the resistance thereof is detected based on the voltage.

7. The image forming apparatus of claim 1, wherein the transfer medium is an intermediate transferer and the transferer transfers the toner image from the image carrier onto the intermediate transferer.

8. The image forming apparatus of claim 2, wherein the image carrier is a belt and the transferer transfers a toner image from the belt onto the transfer medium.

9. The image forming apparatus of claim 8, wherein the electrical characteristic detector detects the electrical characteristic value when the transfer medium is not present in the transfer area.

10. The image forming apparatus of claim 1, wherein the first corrector corrects the value of the electrical current based on plural predetermined thresholds.

11. The image forming apparatus of claim 1, wherein the electrical characteristic detector performs a detection operation during color displacement correction in which positional differences among different color toner images are corrected.

12. The image forming apparatus of claim 1, wherein the electrical characteristic detector performs a detection operation during image density adjustment comprising detecting a toner adhesion amount and changing an image forming condition to adjust the image density.

13. The image forming apparatus of claim 12, wherein the value of the electrical current is corrected before the image forming condition is changed to adjust the image density.

14. A method of setting a transfer current in an image forming apparatus having
an image carrier configured to carry a toner image,
a transferer configured to apply a transfer bias that is controlled in a constant-current control method to a transfer medium to form a transfer electric field to transfer a toner image from the image carrier to the transfer medium,
an electrical characteristic detector configured to detect an electrical characteristic value corresponding to a resistance in a conductor connecting the constant-current source to the transferer and through which an electrical current applied to the transferer flows, and
an environment detector configured to detect an environmental condition inside the image forming apparatus,
the method of setting the transfer current comprising:
correcting the electrical current applied to the transferer based on a detection result of the electrical characteristic value detected by the electrical characteristic detector and a predetermined threshold;
correcting the electrical current based on a detection result of the environment condition; and
setting the threshold based on the detection result of the environment condition,
wherein when the correcting the electrical current applied to the transferer and the correcting the electrical current based on the detection result of the environment condition are performed simultaneously, correcting the value of the electrical current using the threshold set based on the detection result of the environment condition.

15. The method of setting the transfer current of claim 14, further comprising detecting a width of the transfer medium in a direction perpendicular to a transport direction thereof,
wherein an amount of the electrical current corrected based on the detection result of the environment condition is adjusted based on a detection result of the width of the transfer medium.

16. An image forming method, comprising:
applying a bias that is controlled in a constant-current control method with a transferer in an image forming apparatus to a transfer medium to transfer a toner image from an image carrier onto the transfer medium;
detecting an electrical characteristic value, with an electrical characteristic detector in the image forming apparatus, corresponding to a resistance in a conductor connecting the constant-current source to the transferer and through which an electrical current flows when the bias is applied;
detecting an environmental condition inside the image forming apparatus;
correcting the electrical current applied to the transferer based on a detection result of the electrical characteristic value and a predetermined threshold;
correcting the electrical current applied to the transferer based on a detection result of the environment condition; and
setting the threshold based on the detection result of the environment condition,
wherein when the correcting the electrical current applied to the transferer and the correcting the electrical current based on the detection result of the environment condition are performed simultaneously, correcting the value of the electrical current using the threshold set based on the detection result of the environment condition.

17. The image forming method of claim 16, further comprising detecting a width of the transfer medium in a direction perpendicular to a transport direction thereof,
 wherein an amount of the electrical current corrected based the detection result of the electrical characteristic value is adjusted based on a detection result of the width of the transfer medium.

\* \* \* \* \*